(12) United States Patent
Jeon et al.

(10) Patent No.: US 11,893,197 B2
(45) Date of Patent: Feb. 6, 2024

(54) DIGITIZER AND ELECTRONIC APPARATUS INCLUDING THE SAME

(71) Applicant: Samsung Display Co., Ltd., Yongin-si (KR)

(72) Inventors: Yongchan Jeon, Cheonan-si (KR); Hirotsugu Kishimoto, Hwaseong-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/096,270

(22) Filed: Jan. 12, 2023

(65) Prior Publication Data
US 2023/0289021 A1    Sep. 14, 2023

(30) Foreign Application Priority Data
Mar. 14, 2022  (KR) .......................... 10-2022-0031190

(51) Int. Cl.
*G06F 3/046* (2006.01)

(52) U.S. Cl.
CPC .... *G06F 3/046* (2013.01); *G06F 2203/04102* (2013.01)

(58) Field of Classification Search
CPC .................... G06F 3/046; G06F 2203/04102
See application file for complete search history.

(56) References Cited

U.S. PATENT DOCUMENTS

| 9,639,121 | B2 | 5/2017 | Min et al. | |
| 11,570,911 | B2* | 1/2023 | Shin ..................... | G06F 1/1641 |
| 2020/0401275 | A1 | 12/2020 | Shin et al. | |
| 2021/0357048 | A1* | 11/2021 | Kishimoto ........... | H10K 77/111 |
| 2022/0043481 | A1 | 2/2022 | Shin et al. | |
| 2022/0075416 | A1* | 3/2022 | Kishimoto ............ | G06F 3/0412 |
| 2022/0091632 | A1* | 3/2022 | Hong ................... | G06F 1/1616 |
| 2022/0091689 | A1* | 3/2022 | Kishimoto ............ | G06F 1/1643 |
| 2022/0221952 | A1* | 7/2022 | Kishimoto .............. | G06F 3/046 |
| 2023/0084467 | A1* | 3/2023 | Gu ........................ | G06F 1/1616 |
| | | | | 361/679.01 |

(Continued)

FOREIGN PATENT DOCUMENTS

| KR | 1020190003257 A | 1/2019 |
| KR | 102051803 B1 | 1/2020 |

(Continued)

*Primary Examiner* — Ibrahim A Khan
(74) *Attorney, Agent, or Firm* — CANTOR COLBURN LLP

(57) ABSTRACT

An electronic apparatus includes a display panel including non-folding areas arranged in a first direction and a folding area between the first and second non-folding areas, and a digitizer disposed under the display panel, where the digitizer includes base layers each including non-folding parts and a folding part in which holes are defined, a first group coil including first to fourth sensing coils each having first and second portions overlapping the non-folding parts and a third portion overlapping the folding part and surrounding a portion of each of corresponding holes of the holes, and a second group coil insulated from the first group coil, where two or fewer third portions are disposed in a same layer between holes adjacent to each other in a second direction crossing the first direction among the holes.

20 Claims, 31 Drawing Sheets

(56) References Cited

U.S. PATENT DOCUMENTS

| | | | |
|---|---|---|---|
| 2023/0096996 A1* | 3/2023 | Kishimoto | G06F 1/1616 345/174 |
| 2023/0107534 A1* | 4/2023 | Kishimoto | G06F 3/0446 345/173 |
| 2023/0132000 A1* | 4/2023 | Kishimoto | G06F 1/1643 361/679.01 |
| 2023/0215301 A1* | 7/2023 | Kishimoto | G06F 3/041 361/679.27 |
| 2023/0229194 A1* | 7/2023 | Kishimoto | G06F 1/1641 361/679.01 |

FOREIGN PATENT DOCUMENTS

| | | |
|---|---|---|
| KR | 1020200124099 A | 11/2020 |
| KR | 1020210000359 A | 1/2021 |

\* cited by examiner

FIG. 1B
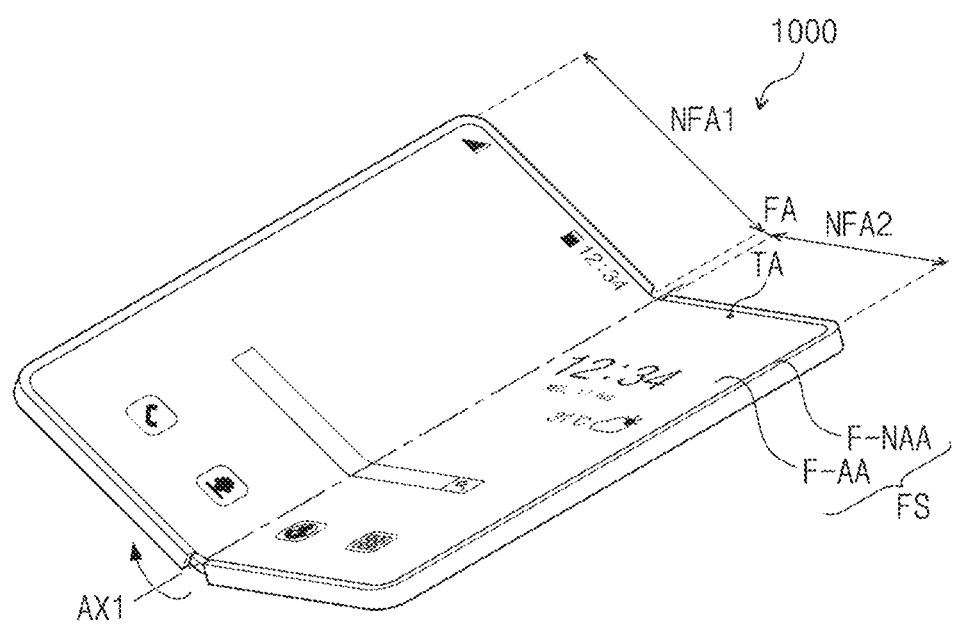
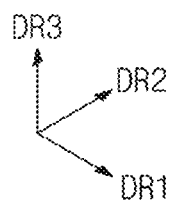

FIG. 1C
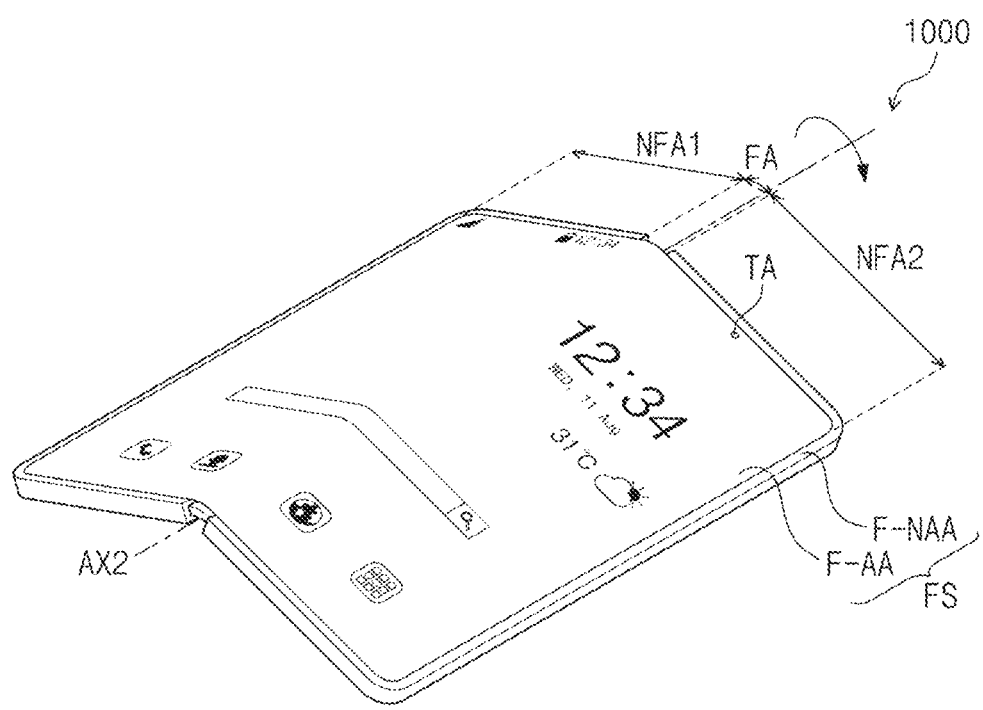
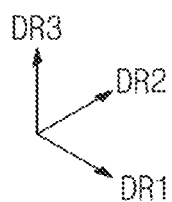

FIG. 11A
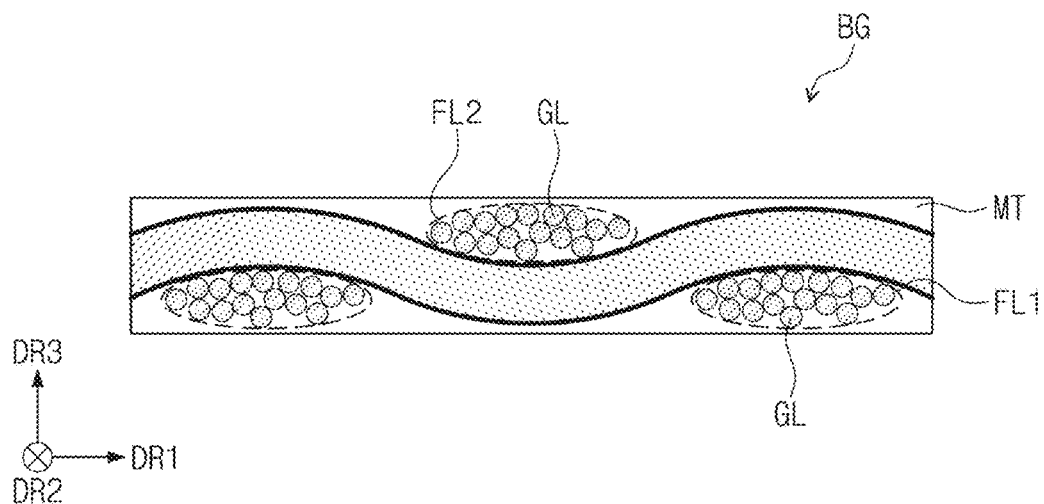
FIG. 11B
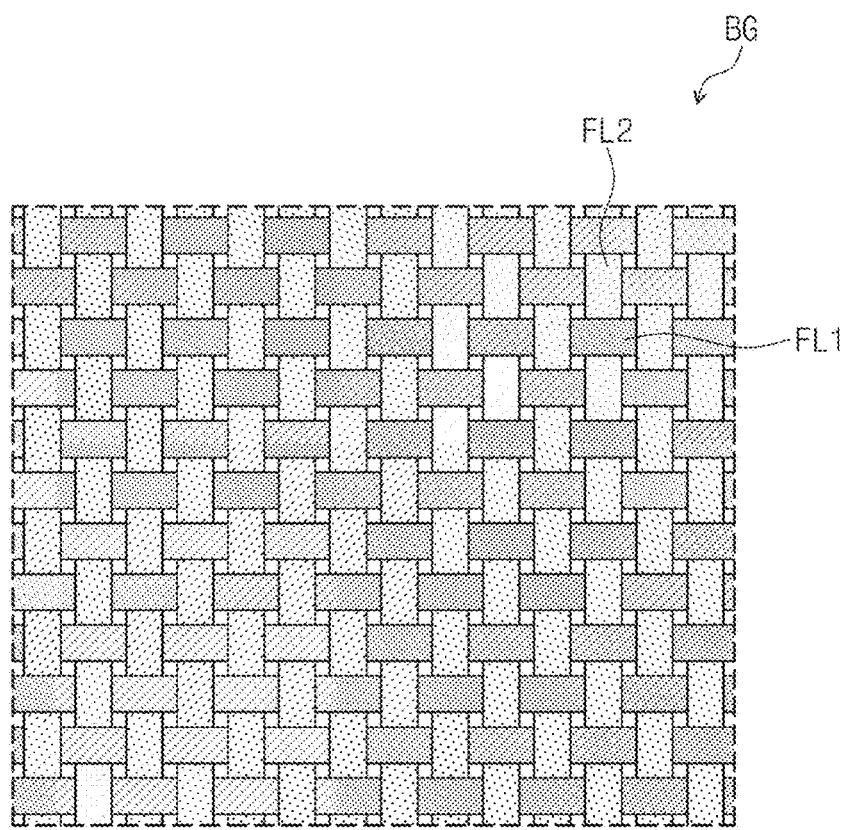
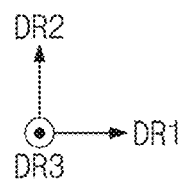

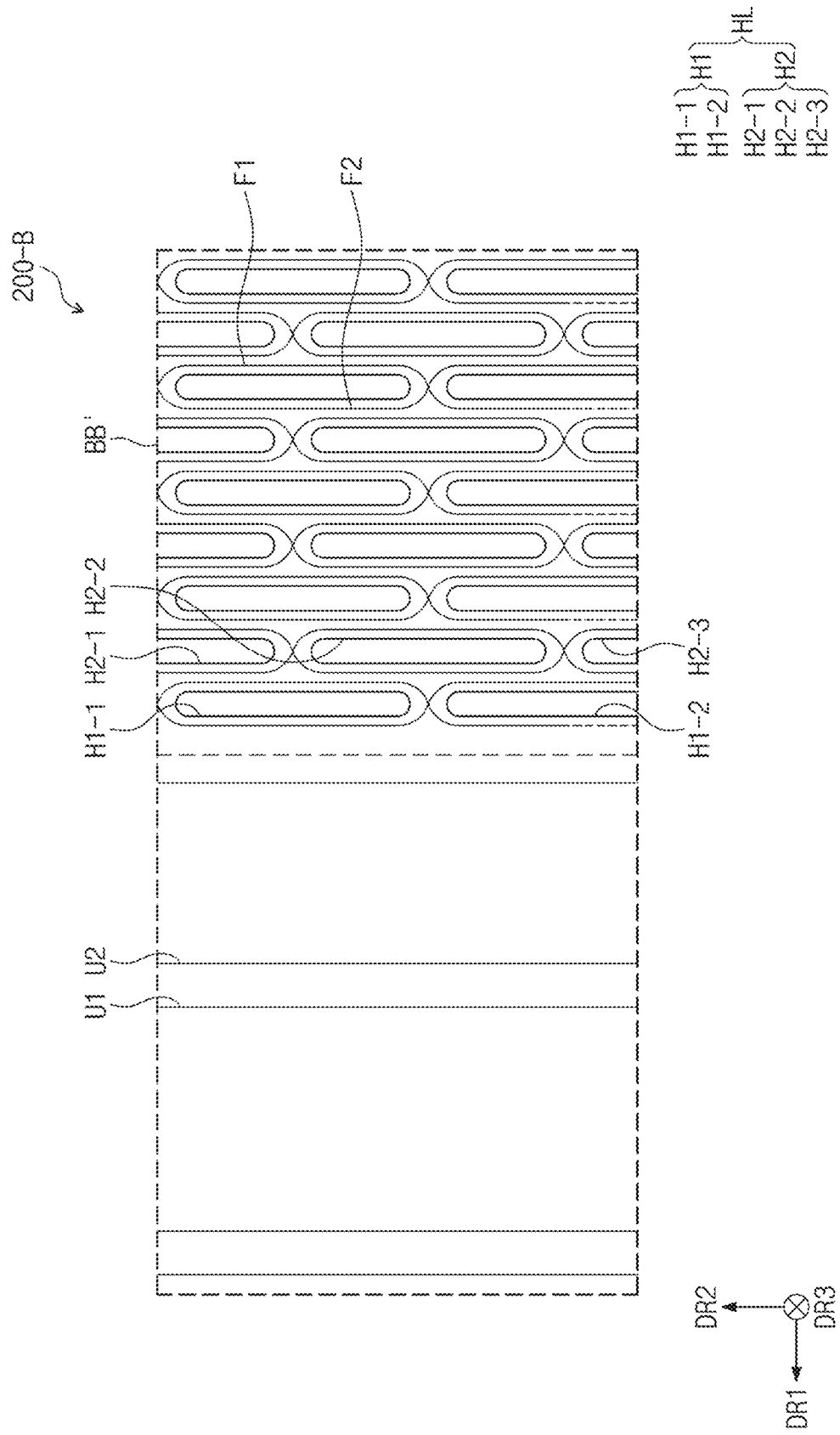

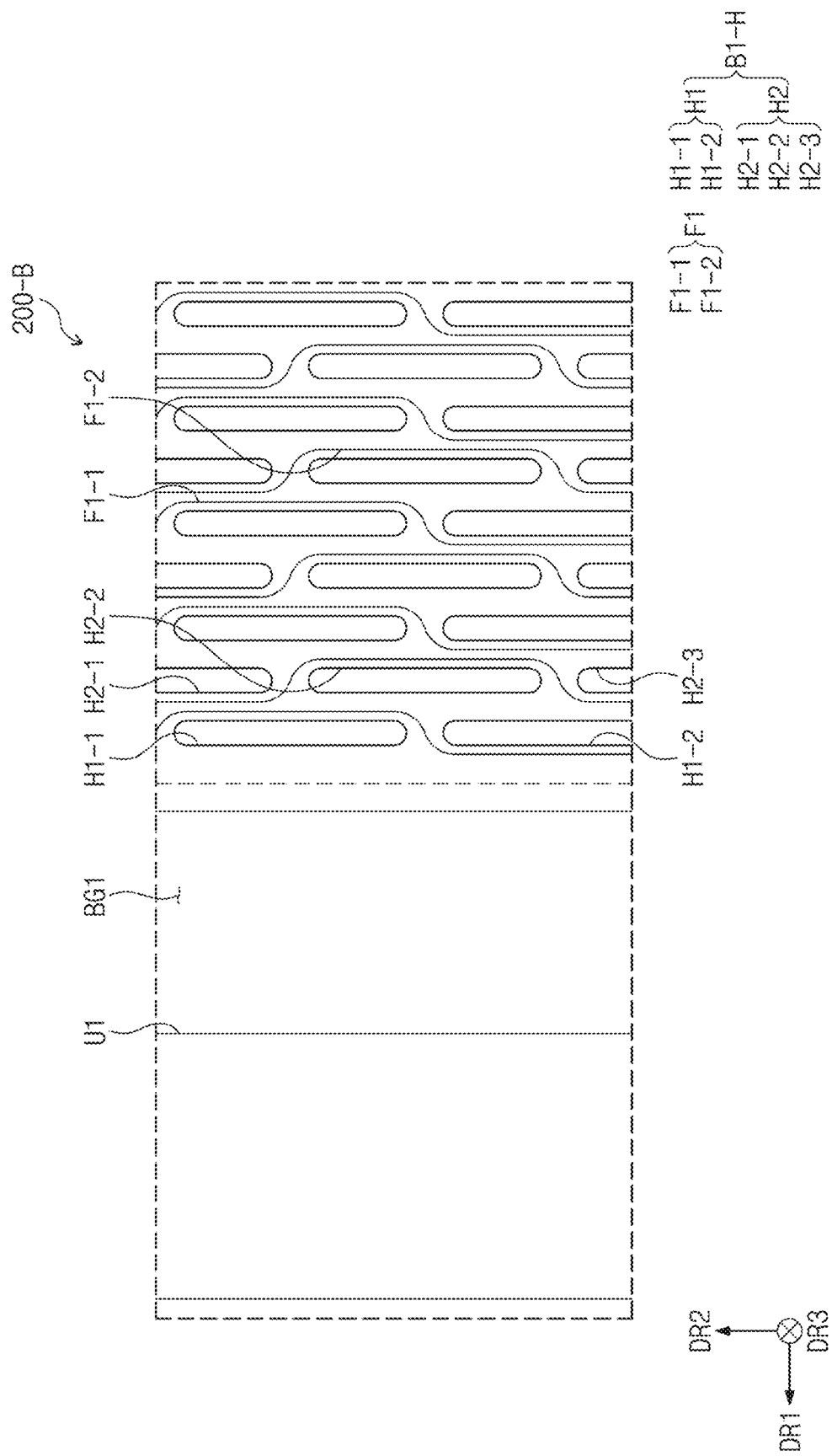

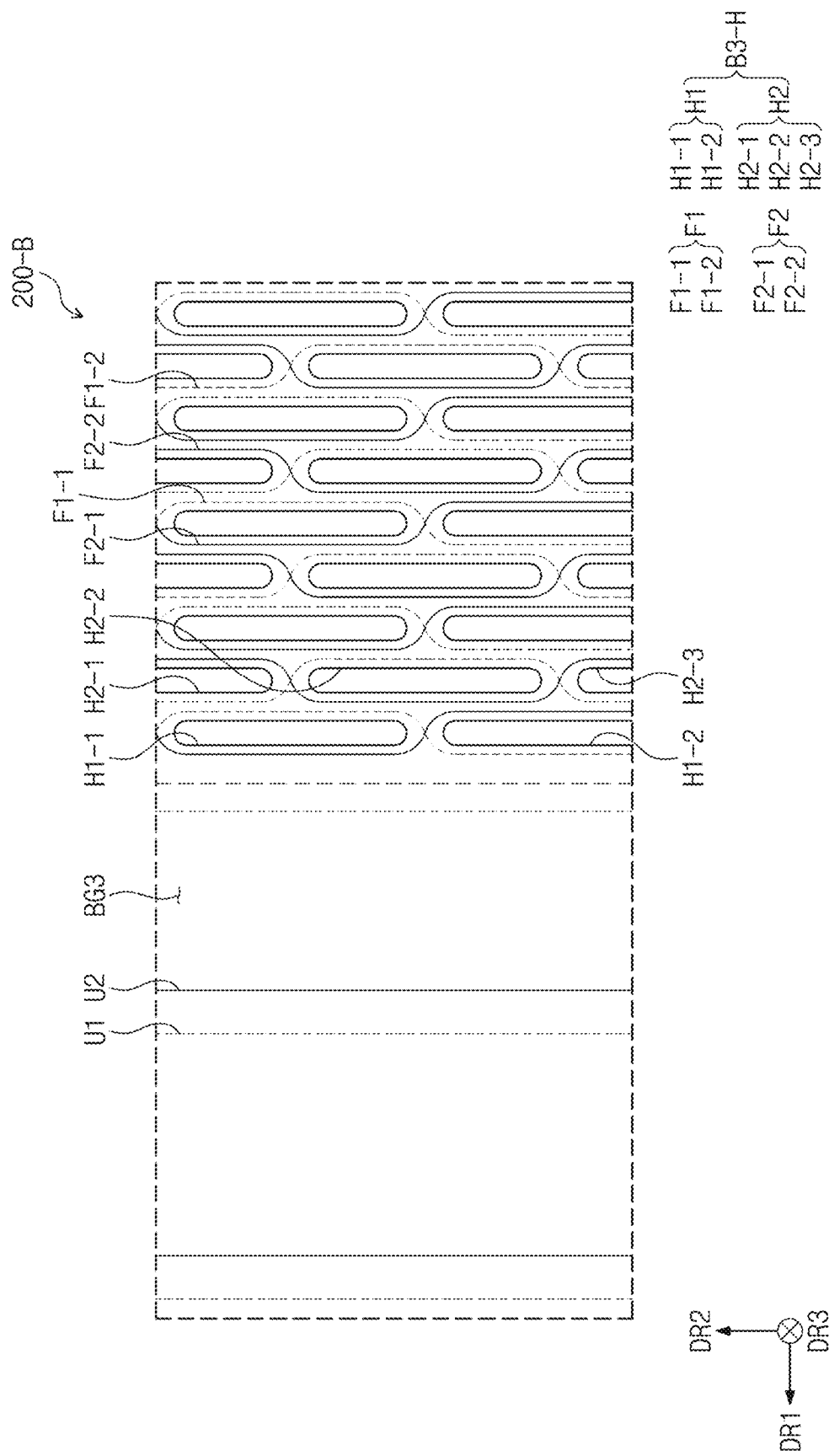

DIGITIZER AND ELECTRONIC APPARATUS INCLUDING THE SAME

This application claims priority to Korean Patent Application No. 10-2022-0031190, filed on Mar. 14, 2022, and all the benefits accruing therefrom under 35 U.S.C. § 119, the content of which in its entirety is herein incorporated by reference.

BACKGROUND

1. Field

The disclosure herein relates to an electronic apparatus including a digitizer, and more particularly, to an electronic apparatus having improved folding characteristics.

2. Description of the Related Art

In the information society, an electronic apparatus is gaining importance as a visual information delivery medium. The electronic apparatus is activated by receiving an electrical signal. The electronic apparatus may include a digitizer that senses an input applied from outside a display panel that displays an image.

The digitizer of the electronic apparatus may include various sensing coils to be activated by an electrical signal. An area in which the sensing coils are activated may respond to a signal applied from the outside.

SUMMARY

The disclosure provides an electronic apparatus having improved folding characteristics of a digitizer for sensing an external input.

An embodiment of the invention provides an electronic apparatus including: a display panel including first and second non-folding areas arranged in a first direction and a folding area disposed between the first and second non-folding areas, where the folding area is foldable about a folding axis extending in a second direction crossing the first direction; and a digitizer disposed under the display panel, where the digitizer includes: base layers each including a folding part which overlaps the folding area and in which holes are defined, a first non-folding part overlapping the first non-folding area, and a second non-folding part overlapping the second non-folding area; a first group coil including first to fourth sensing coils each including a first portion overlapping the first non-folding part and extending in the first direction, a second portion overlapping the second non-folding part and extending in the first direction, and a third portion overlapping the folding part and surrounding a portion of each of corresponding holes of the holes; and a second group coil insulated from the first group coil, where two or fewer third portions are disposed in a same layer between holes adjacent to each other in the second direction among the holes.

In an embodiment, the base layers may include a first base layer including a front surface and a rear surface and a second base layer disposed on the front surface of the first base layer, wherein the second group coil is disposed on the rear surface of the first base layer.

In an embodiment, the first to fourth sensing coils may be sequentially arranged in the second direction, the first and second sensing coils may be disposed on the front surface of the first base layer, and the third and fourth sensing coils may be disposed on a front surface of the second base layer.

In an embodiment, when viewed in a plan view, a separation distance in the second direction between the first portion of the first sensing coil and the first portion of the second sensing coil may be shorter than a separation distance in the second direction between the first portion of the second sensing coil and the first portion of the third sensing coil.

In an embodiment, the first group coil may further include a bridge pattern disposed on the rear surface of the first base layer, wherein at least one of the first portions respectively included in the first to fourth sensing coils is connected to the bridge pattern through a contact hole defined in at least one of the base layers.

In an embodiment, the first to fourth sensing coils may be sequentially arranged in the second direction, the first and third sensing coils may be disposed on the front surface of the first base layer, and the second and fourth sensing coils may be disposed on the second base layer.

In an embodiment, when viewed in a plan view, a separation distance in the second direction between the first portion of the first sensing coil and the first portion of the third sensing coil may be equal to a separation distance in the second direction between the first portion of the second sensing coil and the first portion of the fourth sensing coil.

In an embodiment, the base layers may include a first base layer including a front surface and a rear surface, a second base layer disposed on the front surface of the first base layer, a third base layer disposed on the second base layer, and a fourth base layer disposed on the third base layer, wherein the second group coil is disposed on the rear surface of the first base layer.

In an embodiment, the first sensing coil may be disposed on the front surface of the first base layer, the second sensing coil may be disposed on a front surface of the second base layer, the third sensing coil may be disposed on a front surface of the third base layer, and the fourth sensing coil may be disposed on a front surface of the fourth base layer.

In an embodiment, the holes defined in each of the base layers may include a first group hole and a second group hole each including some of the holes which each extend in the second direction and are arranged to be spaced apart from each other in the second direction, wherein the second group hole is shifted from the first group hole by a predetermined distance in the second direction.

In an embodiment, a first group hole defined in one base layer of the base layers may overlap a first group hole defined in another base layer of the base layers, and a second group hole defined in the one base layer may overlap a second group hole defined in the another base layer.

In an embodiment, when viewed in a plan view, four third portions may be disposed between holes adjacent to each other in the second direction among the holes.

In an embodiment, a first group hole defined in any one base layer of the base layers may be shifted by a predetermined distance in the second direction from a first group hole defined in another base layer of the base layers, and a second group hole defined in the any one base layer may be shifted by a predetermined distance in the second direction from a second group hole defined in the other base layer.

In an embodiment, when viewed in a plan view, two third portions may be disposed in a same layer between holes adjacent to each other in the second direction among the holes.

In an embodiment, one of sensing coils included in the second group coil may include a fourth portion overlapping the first non-folding part and extending in the second direction, a fifth portion overlapping the second non-folding part and extending in the second direction, and a sixth portion overlapping the folding part and surrounding a portion of each of holes arranged to be spaced apart from each other in the second direction among the holes, and the holes may include a first hole and a second hole which are arranged to be spaced apart from each other in the second direction and each include one side and an opposing side opposite to one side about a central axis extending parallel to the second direction, wherein the sixth portion faces the one side of the first hole and faces the opposing side of the second hole.

In an embodiment, the base layers may include a first base layer including a front surface and a rear surface and a second base layer disposed on the rear surface of the first base layer, where a sixth portion of one of the sensing coils included in the second group coil is disposed on the rear surface of the first base layer, and a sixth portion of another one of the sensing coils included in the second group coil is disposed on a rear surface of the second base layer.

In an embodiment, each of the base layers may include a matrix including a filler, and fiber lines which are disposed inside the matrix and have a woven shape.

In an embodiment, the matrix may include at least one selected from epoxy, polyester, polyamides, polycarbonates, polypropylene, polybutylene, and vinyl ester, and the filler may include at least one selected from silica, barium sulphate, sintered talc, barium titanate, titanium oxide, clay, alumina, mica, boehmite, zinc borate, and zinc titanate.

In an embodiment, a first width of each of the holes in the first direction may be in a range of about 0.1 mm to about 0.5 mm, and a second width of each of the holes in the second direction may be in a range of about 4 mm to about 10 mm.

In an embodiment, a first separation distance between holes adjacent to each other in the first direction among the holes may be in a range of about 0.1 mm to about 0.3 mm, and a second separation distance between holes adjacent to each other in the second direction among the holes may be in a range of about 0.1 mm to about 0.3 mm.

BRIEF DESCRIPTION OF THE DRAWINGS

The accompanying drawings are included to provide a further understanding of the invention, and are incorporated in and constitute a part of this specification. The drawings illustrate embodiments of the invention, in which:

FIG. 1B is a perspective view of an electronic apparatus, in a folding operation state, according to an embodiment of the invention;

FIG. 1C is a perspective view of an electronic apparatus, in a folding operation state, according to an embodiment of the invention;

FIG. 11A is a cross-sectional view of a base layer according to an embodiment of the invention;

FIG. 11B is a plan view of a base layer according to an embodiment of the invention;

FIG. 14 is an enlarged plan view of the area BB' of FIG. 4A;

FIG. 15B is a plan view of a digitizer according to an embodiment of the invention; and FIG. 15C is a plan view of a digitizer according to an embodiment of the invention.

DETAILED DESCRIPTION

Figure 1A:
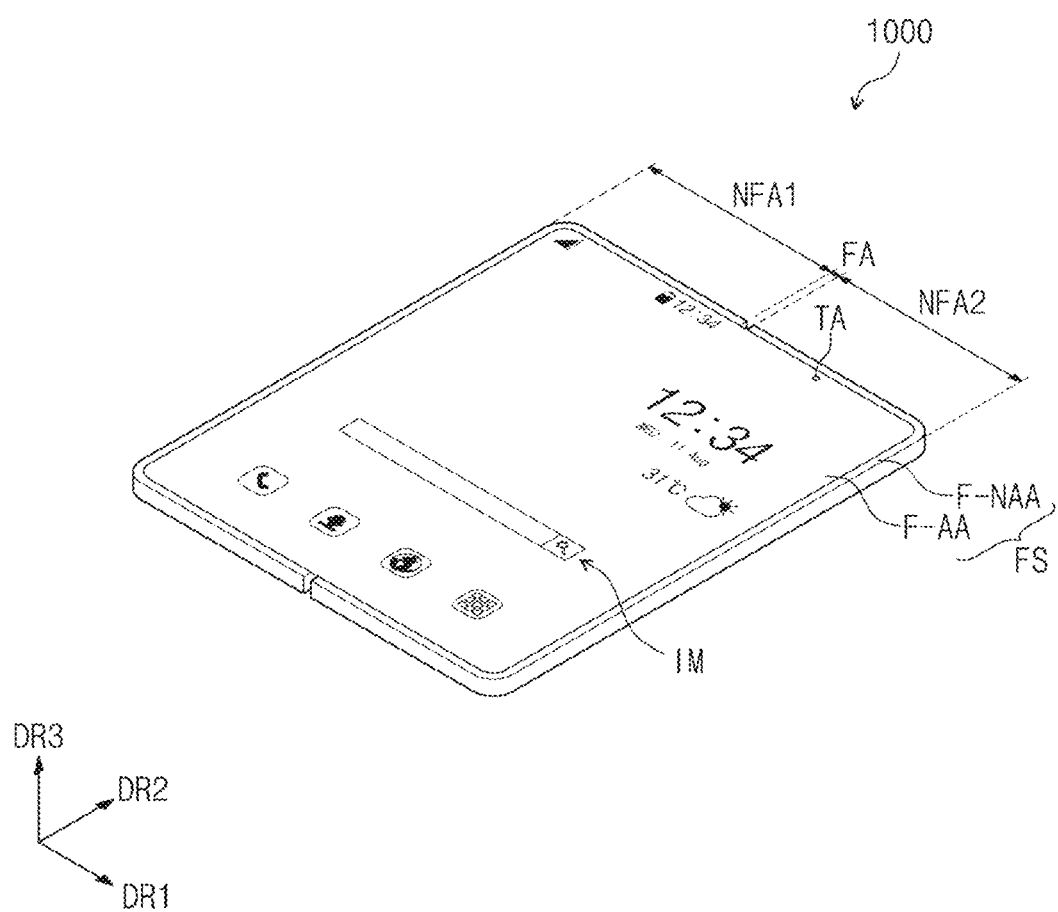
FIG. 1A is a perspective view of an electronic apparatus, in an unfolded state, according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being "on", "connected to", or "coupled to" another element or layer, it can be directly on, connected to, or coupled to the other element or layer, or intervening elements or layers may be present.

Like reference numerals refer to like elements throughout this specification. In the figures, the thicknesses, ratios, and dimensions of elements are exaggerated for effective description of the technical contents.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an overly idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1D:
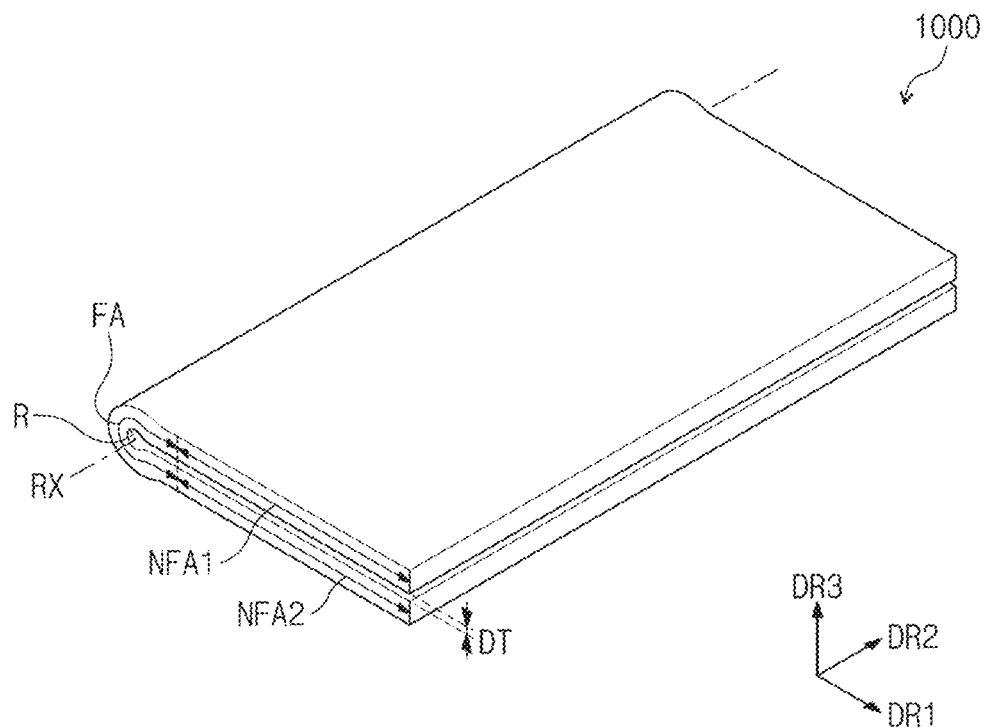
FIG. 1D is a perspective view of an electronic apparatus, in a folded state, according to an embodiment of the invention.
Figure 1E:
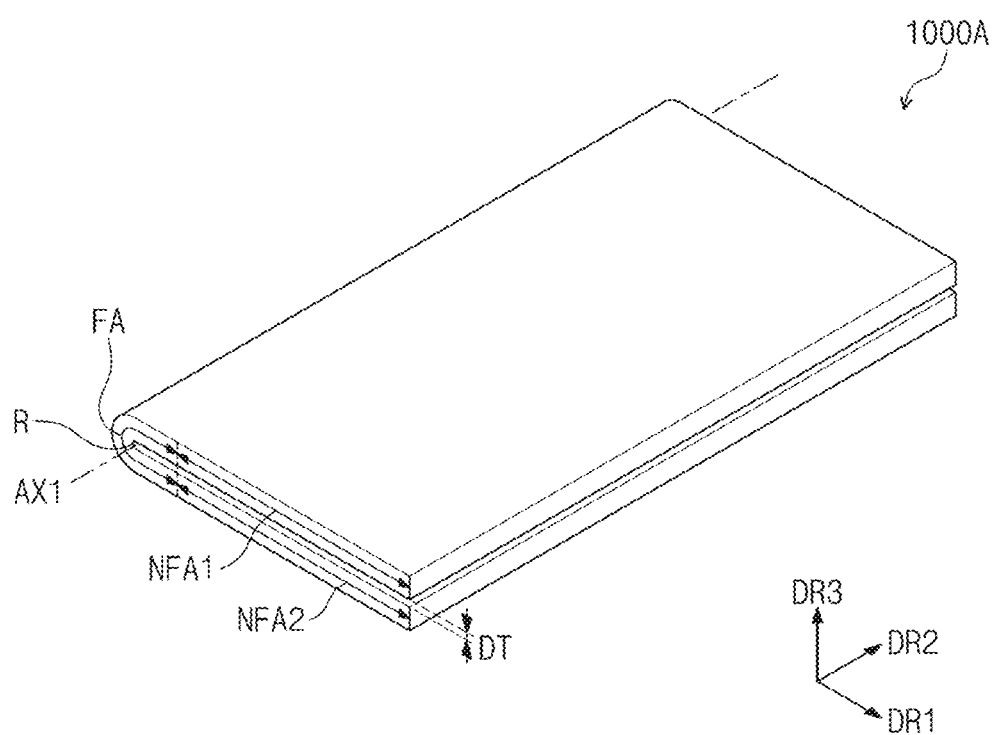
FIG. 1E is a perspective view of an electronic apparatus, in a folded state, according to an embodiment of the invention.

FIG. 1A is a perspective view of an electronic apparatus, in an unfolded state, according to an embodiment of the invention. FIG. 1B is a perspective view of an electronic apparatus, in a folding operation state, according to an embodiment of the invention. FIG. 1C is a perspective view of an electronic apparatus, in a folding operation state, according to an embodiment of the invention. FIG. 1D is a perspective view of an electronic apparatus, in a folded state, according to an embodiment of the invention. FIG. 1E is a perspective view of an electronic apparatus, in a folded state, according to an embodiment of the invention.

Referring to FIGS. 1A to 1D, an electronic apparatus 1000 according to an embodiment of the invention may be an apparatus that is activated according to an electrical signal. Embodiments of the electronic apparatus 1000 may include various types of electronic apparatus. In an embodiment, for example, the electronic apparatus 1000 may include a tablet, a laptop computer, a personal computer, a smart television, or the like. In an embodiment, as shown in FIGS. 1A to 1D the electronic apparatus 1000 may be a smartphone.

The electronic apparatus 1000 may display an image IM toward a third direction DR3 on a display surface FS parallel to each of a first direction DR1 and a second direction DR2. The display surface FS on which the image IM is displayed may correspond to a front surface of the electronic apparatus 1000. The image IM may include a still image as well as a moving image. In an embodiment, as shown in FIGS. 1A to 1C, the image IM may be an Internet search window and a watch window, for example.

According to an embodiment, a front surface (or a top surface) and a rear surface (or a bottom surface) of each of members are defined in relation to a direction in which the image IM is displayed in an unfolded state of the electronic apparatus 1000. The front surface and the rear surface may be opposing each other in the third direction DR3, and a normal direction of each of the front surface and the rear surface may be parallel to the third direction DR3. Here, the third direction DR3 may be a thickness direction of the electronic apparatus 1000.

The electronic apparatus 1000 may sense an external input applied from the outside. The external input may be a user's input. The user's input may include various types of inputs such as a part of a user's body, an electromagnetic pen, light, heat, and pressure. The electronic apparatus 1000 may further include a digitizer that is driven in a method using electromagnetic resonance (EMR), which is resonance by electromagnetic induction, in an embodiment where the electronic apparatus 1000 senses an input by the electromagnetic pen, but the electronic apparatus 1000 is not limited to any one embodiment.

FIG. 1A illustrates the electronic apparatus 1000 in an unfolded state. The display surface FS of the electronic apparatus 1000 may include an active area F-AA and a peripheral area F-NAA. The peripheral area F-NAA is adjacent to the active area F-AA. The peripheral area F-NAA may have a lower light transmittance than the active area F-AA and may have a predetermined color.

According to an embodiment, the peripheral area F-NAA may surround the active area F-AA. Accordingly, the shape of the active area F-AA may be substantially defined by the peripheral area F-NAA. However, this is exemplarily illustrated, and alternatively, the peripheral area F-NAA may be disposed adjacent to only one side of the active area F-AA or may be omitted from the display surface FS.

The display surface FS may further include a signal transmissive area TA. Although exemplarily illustrated as being included inside the active area F-AA, the signal transmissive area TA is not limited thereto, and alternatively, the signal transmissive area TA may be included inside the peripheral area F-NAA or surrounded by each of the active area F-AA and the peripheral area F-NAA.

The signal transmissive area TA has a higher transmittance than the active area F-AA and the peripheral area F-NAA. Natural light, visible light, or infrared light may move or pass through the signal transmissive area TA.

The electronic apparatus 1000 may further include a sensor for capturing an external image by using visible light passing through the signal transmissive area TA or for determining by using infrared light whether an external object comes close to the electronic apparatus 1000. The sensor may overlap the signal transmissive area TA. Accordingly, it is possible to provide the electronic apparatus 1000 including the sensor with improved reliability.

Referring to FIG. 1B, the electronic apparatus 1000 according to an embodiment may be a foldable electronic apparatus 1000. In an embodiment, for example, the electronic apparatus 1000 may be folded about an imaginary first folding axis AX1 extending in the second direction DR2. The first folding axis AX1 may be defined on the display surface FS.

The electronic apparatus 1000 may include a folding area FA folded about the first folding axis AX1 and first and second non-folding areas NFA1 and NFA2 spaced apart from each other in the first direction DR1 with the folding area FA interposed therebetween.

The electronic apparatus 1000 may be folded in an in-folding manner in which the electronic apparatus 1000 is folded about the first folding axis AX1 so that the first non-folding area NFA1 and the second non-folding area NFA2 face each other. In an embodiment of the invention, a 'first mode' may be defined as a mode in which the electronic apparatus 1000 is in an unfolded state, and a 'second mode' may be defined as a mode in which the electronic apparatus 1000 is in a folded state.

Referring to FIG. 1C, the electronic apparatus 1000 may be folded in an out-folding manner in which the electronic apparatus 1000 is folded about a second folding axis AX2 so that the first non-folding area NFA1 and the second non-folding area NFA2 are opposing each other. The second folding axis AX2 may be defined on a surface opposing the display surface FS.

The electronic apparatus 1000 according to an embodiment may operate in only one manner selected from among the in-folding manner and the out-folding manner in which the folding operations are performed about the collinearly extending folding axes, respectively. However, the electronic apparatus 1000 is not limited thereto, and the electronic apparatus 1000 may also operate in the in-folding manner or the out-folding manner about one folding axis.

Referring to FIG. 1D, at least a portion of the folding area FA may have a predetermined curvature when the electronic apparatus 1000 according to an embodiment is in-folded. The folding area FA may have a center of curvature RX inside the folding area FA, and the electronic apparatus 1000 may be folded with a predetermined radius of curvature R about the center of curvature RX. According to an embodiment, the radius of curvature R may be greater than a distance DT between the first non-folding area NFA1 and the second non-folding area NFA2. Accordingly, in the second mode, the first non-folding area NFA1 and the second non-folding area NFA2 of the electronic apparatus 1000 may be folded more slimly.

Referring to FIG. 1E, an electronic apparatus 1000A according to an embodiment may be folded with a predetermined radius of curvature R when in-folded. In such an embodiment, a distance DT between a portion extending from a folding area FA to a first non-folding area NFA1 and a corresponding portion extending from the folding area FA to a second non-folding area NFA2 may be constant along a first direction DR1 and is not limited to any one embodiment.

Figure 2:
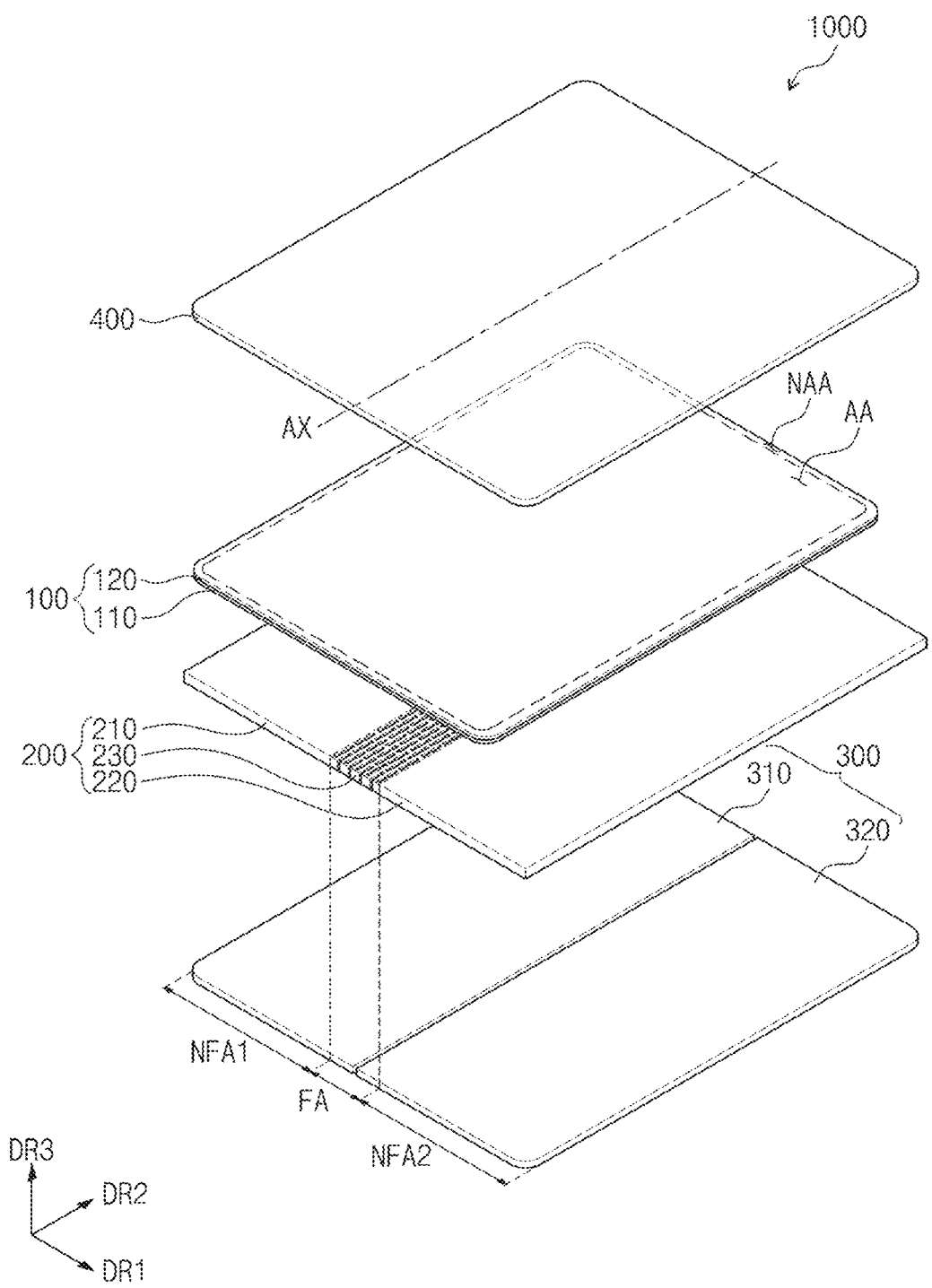
FIG. 2 is an exploded perspective view of an electronic apparatus according to an embodiment of the invention.
Figure 3:
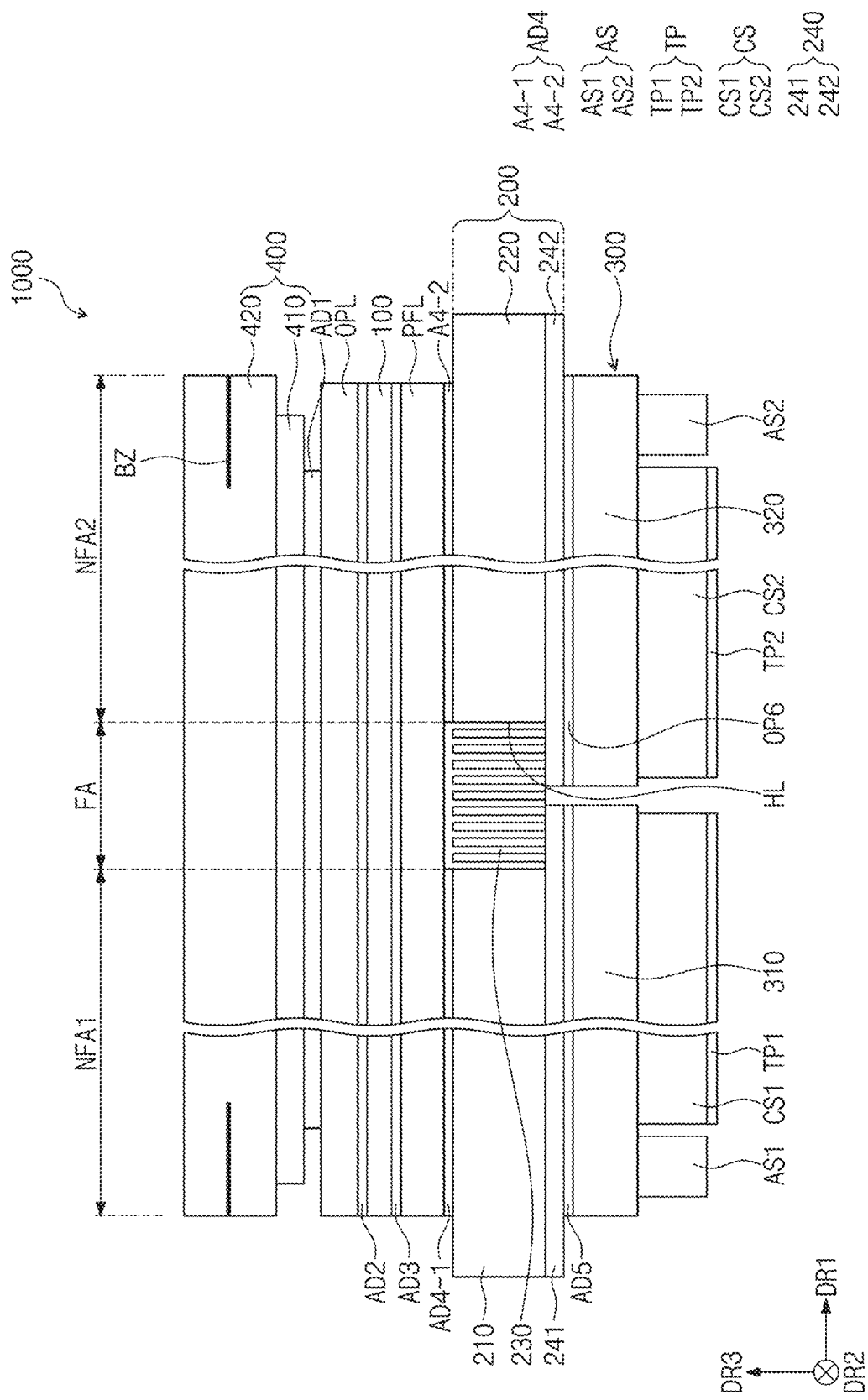
FIG. 3 is a cross-sectional view of an electronic apparatus according to an embodiment of the invention.

FIG. 2 is an exploded perspective view of an electronic apparatus according to an embodiment of the invention. FIG. 3 is a cross-sectional view of an electronic apparatus according to an embodiment of the invention. For convenience of illustration, FIG. 2 illustrates only some of components included in the electronic apparatus 1000.

Referring to FIGS. 2 and 3, an embodiment of the electronic apparatus 1000 may include a display module 100, a digitizer 200, a cushion layer 300, and a window 400. In an embodiment, as illustrated in FIG. 3, the electronic apparatus 1000 may further include a plurality of adhesive layers AD1 to AD5, upper functional layers disposed between the display module 100 and the window 400, and lower functional layers disposed under the digitizer 200.

The adhesive layers AD1 to AD5 to be described below may include at least one selected from an optical clear adhesive (OCA), an optical clear resin (OCR), and a pressure sensitive adhesive (PSA).

The display module 100 according to an embodiment of the invention may be flexible. An active area AA of the display module 100 may correspond to the active area F-AA of the electronic apparatus 1000 illustrated in FIG. 1A, and a peripheral area NAA of the display module 100 may correspond to the peripheral area F-NAA of the electronic apparatus 1000.

The display module 100 may include a display panel 110 for displaying an image and an input sensor 120 for sensing an external input. The display panel 110 may be a light emitting display panel 110 and is not particularly limited. In an embodiment, for example, the display panel 110 may be an organic light emitting display panel 110 or an inorganic light emitting display panel 110. Light emitting elements of the organic light emitting display panel 110 may each include an organic light emitting material. Light emitting elements of the inorganic light emitting display panel 110 may each include quantum dots, quantum rods, or the like. In addition, the display panel 110 according to an embodiment may include a micro-light emitting diode (LED) element and/or a nano-LED element and is not particularly limited.

The display panel 110 may include a plurality of pixels each including a corresponding one of the light emitting elements described above. A light emitting layer included in each of the light emitting elements is disposed in the active area AA and emits light of a predetermined color. In an embodiment where the light emitting layer is provided in plurality, the light emitting elements may respectively correspond to the light emitting layers. Alternatively, where the light emitting layer is provided as a single layer, color filters or color conversion members disposed on the light emitting layer may be further included. Conductive patterns for driving the light emitting elements may be disposed in the peripheral area NAA.

The input sensor 120 may be disposed on the display panel 110. The input sensor 120 may be driven in a capacitive method. The input sensor 120 may sense a position to which a user's hand is applied and/or force of the application of the hand, over the entirety of the active area F-AA. The input sensor 120 may include sensing electrodes insulated from each other, routing lines each connected to a corresponding one of the sensing electrodes, and at least one sensing insulating layer.

The input sensor 120 according to an embodiment may be provided or formed on the display panel 110 through a continuous process. In such an embodiment, the input sensor 120 may be referred to as being 'directly disposed' on the display panel 110. The expression 'directly disposed' may mean that a third component is not disposed between the input sensor 120 and the display panel 110. That is, a separate adhesive member may not be disposed between the input sensor 120 and the display panel 110.

However, the input sensor 120 is not limited thereto and may be provided as a separate module to be bonded to the display panel 110 through an adhesive layer.

The digitizer 200 may be disposed under the display module 100. The digitizer 200 according to an embodiment of the invention may sense an input by an electromagnetic pen. In such an embodiment, the digitizer 200 may be driven in a method using the electromagnetic resonance (EMR), which is resonance by electromagnetic induction.

The digitizer 200 according to an embodiment of the invention may sense an input by the electromagnetic pen, and also support the display module 100 by being disposed on the lower portion of the display module 100. The digitizer 200 may include a first non-folding part 210, a second non-folding part 220, and a folding part 230. In addition, the digitizer 200 may further include a shielding layer 240.

The first non-folding part 210 of the digitizer 200 may overlap at least a portion of the first non-folding area NFA1. The second non-folding part 220 of the digitizer 200 may overlap at least a portion of the second non-folding area NFA2. The folding part 230 may overlap the folding area FA. Accordingly, the folding part 230 may be disposed between the first non-folding part 210 and the second non-folding part 220. Holes HL may be defined in the folding part 230 according to an embodiment of the invention.

A width in the first direction DR1 of the folding part 230 according to an embodiment may be in a range of about 5 millimeters (mm) to about 20 mm.

The holes HL generated by penetrating the folding part 230 in the third direction DR3 from a front surface to a rear surface of the folding part 230 may be defined in the folding part 230 of the digitizer 200 according to an embodiment of the invention. The holes HL may overlap the folding area FA and may be arranged to be spaced apart from each other in the first direction DR1 and the second direction DR2.

The shielding layer 240 may include a first shielding layer 241 and a second shielding layer 242. The first shielding layer 241 may overlap the first non-folding part 210 and a portion of the folding part 230, and the second shielding layer 242 may overlap the second non-folding part 220 and another portion of the folding part 230. The first shielding layer 241 and the second shielding layer 242 may be spaced apart from each other in the first direction DR1 in the folding area FA. However, the shielding layer 240 is not limited thereto and may be disposed in the entirety of the folding area FA to cover the holes HL.

In an embodiment, the shielding layer 240 may include a metal. In an embodiment, for example, the shielding layer 240 may include magnetic metal powder (MMP). However, the material of the shielding layer 240 is not limited thereto and may include at least one selected from permalloy and invar which are alloys of nickel (Ni) and iron (Fe), and stainless steel.

According to an embodiment of the invention, when the electronic apparatus 1000 performs folding operations during which the electronic apparatus 1000 repeatedly switches between the first mode and the second mode, the display module 100 in changed shapes may be supported by the digitizer 200, and the shape of the display module 100 may be changed to correspond to the shape of the digitizer 200.

The digitizer 200 according to an embodiment may include sensing coils and one or more base layers on which the sensing coils are disposed. Each of the base layers may include a matrix part and a fiber-reinforced composite material disposed inside the matrix part. The reinforcing fiber may include at least one selected from carbon fiber and glass fiber. The matrix part may include polymer resin. The matrix part may include thermoplastic resin.

The digitizer 200 according to an embodiment of the invention may function as a protective member for protecting the display module 100 and as a sensing member for sensing an input of an electromagnetic pen. Functions of the protective member and the sensing member will be described later in detail.

The cushion layer 300 may be disposed on the lower portion of the digitizer 200. The cushion layer 300 may protect the display module 100 from an impact transmitted from under the display module 100. The cushion layer 300 may include foam or sponge. The foam may include polyurethane foam or thermoplastic polyurethane foam. In an embodiment where the cushion layer 300 includes the foam, a barrier film may be added to the cushion layer 300 as a base layer, and a foaming agent may be foamed on the barrier film to provide the cushion layer 300.

The first cushion layer 310 is coupled to the first shielding layer 241 by one part of the fifth adhesive layer AD5, and the second cushion layer 320 is coupled to the second shielding layer 242 by another part of the fifth adhesive layer AD5. An opening may be defined in the fifth adhesive layer AD5 may include to overlap at least a portion of the folding part 230. The cushion layer 300 may include a first cushion layer 310 and a second cushion layer 320. The first cushion layer 310 may overlap the first non-folding part 210 and a portion of the folding part 230. The second cushion layer 320 may overlap the second non-folding part 220 and another portion of the folding part 230. The first cushion layer 310 and the second cushion layer 320 may be spaced apart from each other in the first direction DR1 in the folding area FA.

The first cushion layer 310 and the second cushion layer 320 may prevent foreign matter from being introduced into the holes HL defined in the folding part 230 when the electronic apparatus 1000 is in the first mode. Even when the folding part 230 is folded with a predetermined curvature when the electronic apparatus 1000 enters the second mode, the shape of the digitizer 200 may easily change because the first cushion layer 310 and the second cushion layer 320 are spaced apart from each other in an area overlapping the folding part 230.

The window 400 is disposed on the display module 100. The window 400 may include a first layer 410, a second layer 420, and a bezel pattern BZ. The window 400 may include an optically transparent material so that light provided from the display module 100 may be transmitted. The window 400 provides the display surface FS (see FIG. 1A) of the electronic apparatus 1000.

The window 400 may include or be made of a flexible material. Accordingly, the window 400 may be folded or unfolded about a folding axis AX. That is, according to the operations of switching between the first mode and the second mode, the shape of the window 400 may also change corresponding to the digitizer 200.

The first layer 410 according to an embodiment may include a thin film glass or a synthetic resin film. In an embodiment where the first layer 410 includes the thin film glass, a thickness of the first layer 410 may be about 100 micrometers (μm) or less. In an embodiment, for example, the thickness of the first layer 410 may be about 30 μm but is not limited thereto.

In an embodiment where the first layer 410 includes the synthetic resin film, the first layer 410 may include a polyimide (PI) film or a polyethylene terephthalate (PET) film.

The first layer 410 may have a multilayer structure or a single-layer structure. In an embodiment, for example, the first layer 410 may include a plurality of synthetic resin films bonded with a detachable adhesive or include a glass substrate and a synthetic resin film bonded with a detachable adhesive.

The second layer 420 is disposed on the first layer 410. The second layer 420 may include a material having a lower modulus than that of the first layer 410. In an embodiment, for example, the second layer 420 may be a film including an organic material. The second layer 420 may have a greater thickness than the first layer 410. Accordingly, the second layer 420 may protect a top surface of the first layer 410.

The second layer 420 may include one or more functional layers. The functional layers may include at least one selected from a window protective layer, an anti-fingerprint layer and an anti-reflection layer.

The window 400 transmits an image from the display module 100, and at the same time, alleviates an external shock, thereby preventing the display module 100 from being damaged or malfunctioning due to the external shock.

An optical layer OPL may be disposed between the display module 100 and the window 400. The optical layer OPL may be bonded to the window 400 through a first adhesive layer AD1 and may be bonded to the display module 100 through a second adhesive layer AD2.

The optical layer OPL may reduce the degree of reflection of external light. The optical layer OPL may include a stretchable synthetic resin film. In an embodiment, for example, the optical layer OPL may be provided by dyeing an iodine compound on a polyvinyl alcohol (PVA) film. Alternatively, the optical layer OPL may include a color filter. The optical layer OPL may include various layers as long as the layers reduce the degree of reflection of external light, and is not limited to any one embodiment.

A panel protective layer PFL may be disposed between the display module 100 and the digitizer 200. The panel protective layer PFL and the display module 100 may be bonded by a third adhesive layer AD3. The panel protective layer PFL may be disposed on the lower portion of the display module 100 to protect the lower portion of the display module 100. The panel protective layer PFL may include a flexible plastic material. In an embodiment, for example, the panel protective layer PFL may include polyethylene terephthalate.

The digitizer 200 and the panel protective layer PFL may be bonded to each other by a fourth adhesive layer AD4. The fourth adhesive layer AD4 may include a first part AD4-1 and a second part AD4-2. The first part AD4-1 and the second part AD4-2 may be spaced apart from each other with the folding area FA therebetween.

The first part AD4-1 may bond the first non-folding part 210 to a portion of the panel protective layer PFL, and the second part AD4-2 may bond the second non-folding part 220 to another portion of the panel protective layer PFL.

The electronic apparatus 1000 may further include a metal plate CS, an insulating layer TP, and a step compensation member AS that are disposed under the cushion layer 300. The metal plate CS may protect the display module 100 by absorbing an external shock. The metal plate CS may include stainless steel. The metal plate CS may include a first metal layer CS1 and a second metal layer CS2. The first metal layer CS1 may be bonded to the first cushion layer 310 by a portion of an additional adhesive layer, and the second metal layer CS2 may be bonded to the second cushion layer 320 by another portion of the additional adhesive layer.

The insulating layer TP is disposed under the metal plate CS. The insulating layer TP may prevent static electricity from being introduced into the metal plate CS. The insulating layer TP may be an insulating film. The insulating layer TP may include or be defined by a first insulating layer TP1 and a second insulating layer TP2, and the first insulating layer TP1 and the second insulating layer TP2 may be respectively coupled to the first metal layer CS1 and the second metal layer CS2.

The step compensation member AS is coupled to a lower side of the cushion layer 300. The step compensating member AS may be a double-sided tape or an insulating film. The step compensation member AS may be provided as a first step compensation member AS1 and a second step compensation member AS2, and the first step compensation member AS1 and the second step compensation member AS2 may be respectively coupled to the first cushion layer 310 and the second cushion layer 320.

In an alternative embodiment of the electronic apparatus 1000, at least one selected from the metal plate CS, the insulating layer TP, and the step compensation member AS may be omitted, but is not limited to any one embodiment.

Figure 4A:
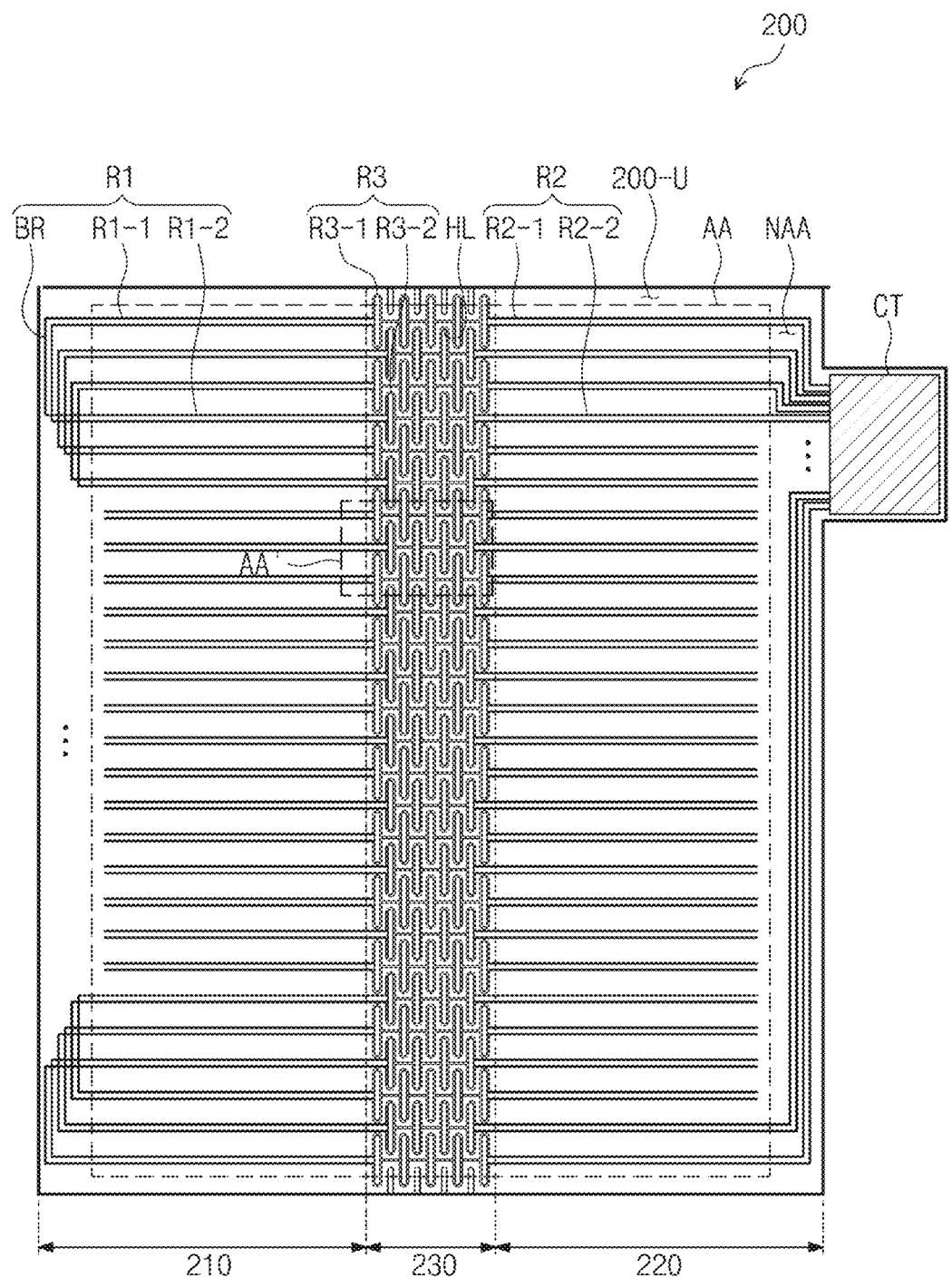
FIG. 4A is a plan view of a digitizer according to an embodiment of the invention.
Figure 4B:
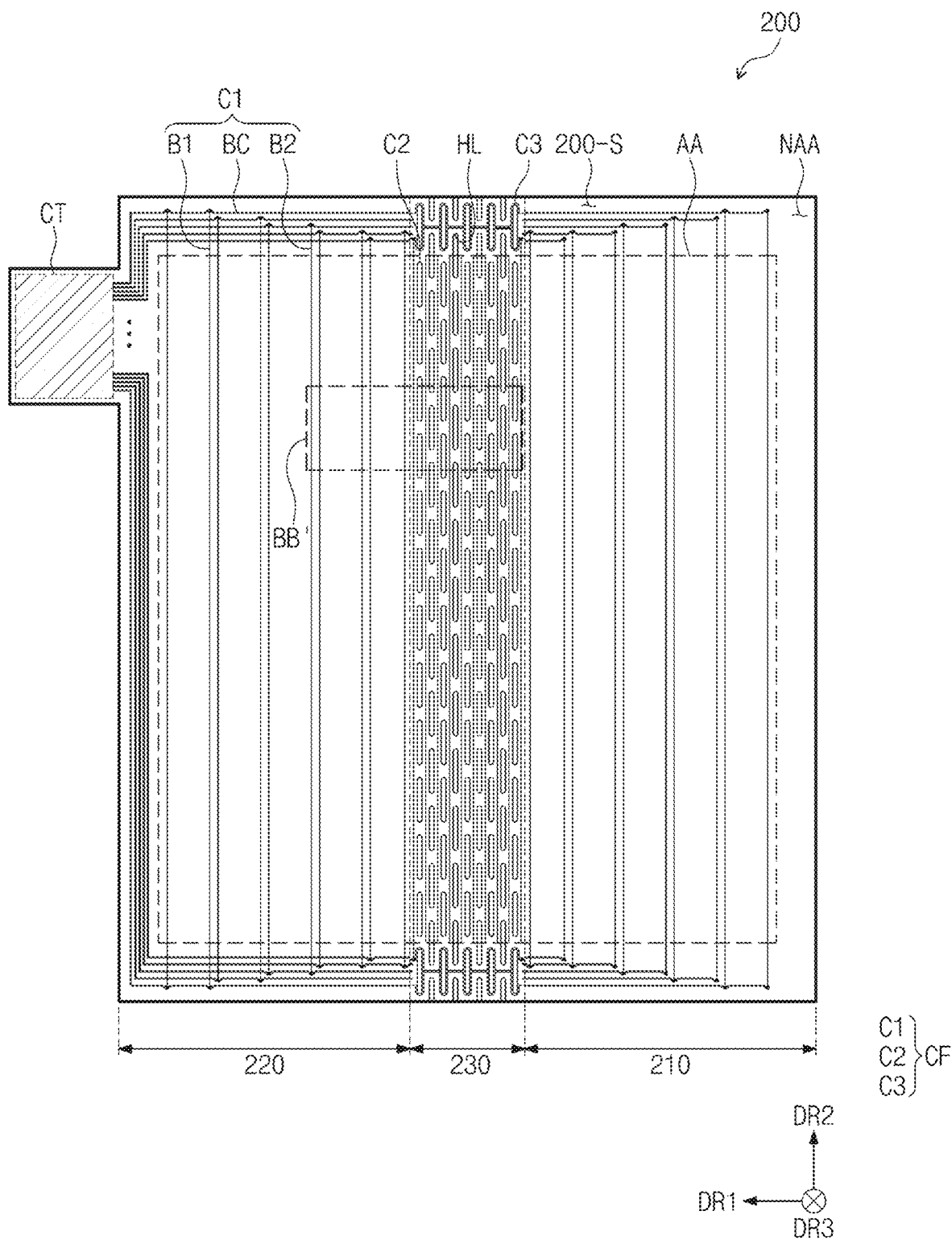
FIG. 4B is a rear view of a digitizer according to an embodiment of the invention.

FIG. 4A is a plan view of a digitizer according to an embodiment of the invention. FIG. 4B is a rear view of a digitizer according to an embodiment of the invention.

FIG. 4A illustrates sensing coils disposed on a front surface 200-U of the digitizer 200, and FIG. 4B illustrates sensing coils disposed on a rear surface 200-S of the digitizer 200.

Referring to FIGS. 4A and 4B, in an embodiment, the digitizer 200 may include an active area AA and a peripheral area NAA. The active area AA may be defined as an area for sensing an input of an electronic pen, and the peripheral area NAA may be an area in which bridge patterns allowing each of sensing coils RF and CF to form a loop are disposed. The digitizer 200 may include the plurality of sensing coils RF and CF and a connector CT.

Each of first sensing coils RF may include a first portion R1, a second portion R2 and a third portion R3, which are connected to each other. The first portion R1 may be disposed in the first non-folding part 210, the second portion R2 may be disposed in the second non-folding part 220, and the third portion R3 may be disposed in the folding part 230. According to an embodiment, a line width of the third portion R3 disposed in the folding part 230 may be smaller than a line width of each of the first portion R1 and the second portion R2 disposed in the first and second non-folding parts 210 and 220, respectively.

The first portion R1 may include a first first pattern (hereinafter, will be referred to as "(1-1)-th pattern") R1-1, a first second pattern (hereinafter, will be referred to as "(1-2)-th pattern") R1-2, and a bridge pattern BR.

The (1-1)-th pattern R1-1 and the (1-2)-th pattern R1-2 may be disposed in an area included in both the first non-folding part 210 and the active area AA. The (1-1)-th pattern R1-1 and the (1-2)-th pattern R1-2 may each extend in the first direction DR1 and may be arranged to be spaced apart from each other in the second direction DR2.

The bridge pattern BR may be disposed in an area included in both the first non-folding part 210 and the peripheral area NAA. The bridge pattern BR may be connected to one end of the (1-1)-th pattern R1-1 and one end of the (1-2)-th pattern R1-2. The bridge pattern BR may be disposed in a layer different from layers in which the (1-1)-th pattern R1-1 and the (1-2)-th pattern R1-2 are disposed. Accordingly, each of the first sensing coils RF may be disposed to have loop shapes.

The second portion R2 may include a first second pattern (hereinafter, will be referred to as "(2-1)-th pattern") R2-1, and a second second pattern (hereinafter, will be referred to as "(2-2)-th pattern") R2-2.

The (2-1)-th pattern R2-1 and the (2-2)-th pattern R2-2 may be disposed in an area included in both the second non-folding part 220 and the active area AA. The (2-1)-th pattern R2-1 and the (2-2)-th pattern R2-2 may each extend in the first direction DR1 and may be arranged to be spaced apart from each other in the second direction DR2.

The (2-1)-th pattern R2-1 may be disposed side by side (or in a same line) with the (1-1)-th pattern R1-1 in the first direction DR1 with the folding part 230 interposed therebetween, and the (2-2)-th pattern R2-2 may be disposed side by side (or in a same line) with the (1-2)-th pattern R1-2 in the first direction DR1 with the folding part 230 interposed therebetween. Each of the (2-1)-th pattern R2-1 and the (2-2)-th pattern R2-2 may extend from the area included in both the second non-folding part 220 and the active area AA to the peripheral area NAA and may be connected to the connector CT.

The third portion R3 may be disposed in the folding part 230. The third portion R3 may include a first third pattern (hereinafter, will be referred to as "(3-1)-th pattern") R3-1 and a second third pattern (hereinafter, will be referred to as "(3-2)-th pattern") R3-2. The (3-1)-th pattern R3-1 and the (3-2)-th pattern R3-2 may surround portions of corresponding holes of the holes HL. The (3-1)-th pattern R3-1 and the (3-2)-th pattern R3-2 may be arranged to be spaced apart from each other in the second direction DR2.

The (3-1)-th pattern R3-1 may be connected to the other end of the (1-1)-th pattern R1-1 and the other end of the (2-1)-th pattern R2-1. Accordingly, the (1-1)-th pattern R1-1 and the (2-1)-th pattern R2-1 spaced apart from each other with the folding part 230 interposed therebetween may be connected by the (3-1)-th pattern R3-1.

The (3-2)-th pattern R3-2 may be connected to the other end of the (1-2)-th pattern R1-2 and the other end of the (2-2)-th pattern R2-2. Accordingly, the (1-2)-th pattern R1-2 and the (2-2)-th pattern R2-2 spaced apart from each other with the folding part 230 interposed therebetween may be connected by the (3-2)-th pattern R3-2.

The first sensing coils RF according to an embodiment of the invention may be disposed in different layers from each other, which will be described later in detail.

Referring to FIG. 4B, second sensing coils CF may include a first portion C1, a second portion C2, and a third portion C3. The first portion C1 may be disposed in the first non-folding part 210 and the second non-folding part 220, and the second portion C2 and the third portion C3 may be disposed in the folding part 230.

The first portion C1 may include a first pattern B1, a second pattern B2, and a bridge pattern BC connected to each other.

The first pattern B1 and the second pattern B2 may each extend in the second direction DR2 and may be arranged to be spaced apart from each other in the first direction DR1. A portion of each of the first pattern B1 and the second pattern B2 may extend from the active area AA to the peripheral area NAA. One end or the other end of each of the first and second patterns B1 and B2 extending to the peripheral area NAA may be connected to the bridge pattern BC.

The bridge pattern BC disposed in the second non-folding part 220 may extend in the peripheral area NAA to be connected to the connector CT.

The second portion C2 may be disposed in an area included in both the folding part 230 and the active area AA. The second portion C2 may extend in the second direction DR2 across the holes HL. According to an embodiment of the invention, the first and second sensing coils RF and CF may sense an input of an electromagnetic pen also in the folding part 230 by including the portions of the coils disposed in the folding part 230. Accordingly, the electronic apparatus 1000 with improved sensing performance may be provided.

The third portion C3 may be disposed in an area included in both the folding part 230 and the peripheral area NAA. In an embodiment where the first pattern B1 of the first portion C1 is disposed in the first non-folding part 210, and the second pattern B2 thereof is disposed in the second non-folding part 220, the third portion C3 may be a pattern connecting the first pattern B1 disposed in the first non-folding part 210 to the second pattern B2 disposed in the second non-folding part 220.

The second sensing coils CF according to an embodiment of the invention may be disposed in different layers from each other, which will be described later in detail.

In such an embodiment, the first sensing coils RF may be referred to as sensing coils, and the second sensing coils CF may be referred to as driving coils. However, an embodiment of the invention is not limited thereto, and the reverse may also be applied. When a current flows through the second sensing coils CF, magnetic field lines may be induced between the second sensing coils CF and the first sensing coils RF. The first sensing coils RF may sense induced electromagnetic force emitted from an electromagnetic pen and output the sensed induced electromagnetic force to the first sensing coils RF as a sensing signal.

Figure 5:
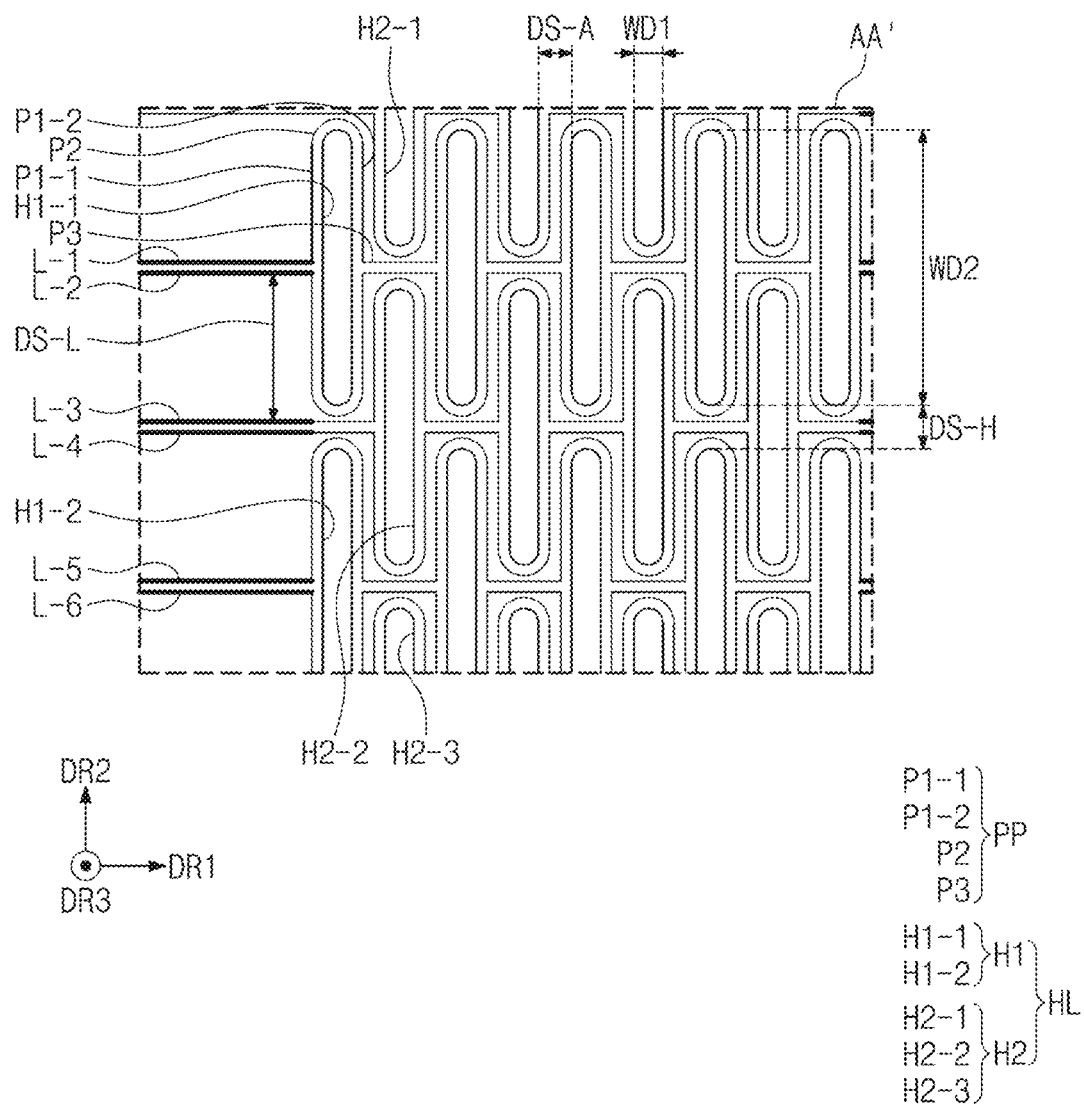
FIG. 5 is an enlarged plan view of the area AN of FIG. 4A.
Figure 6A:
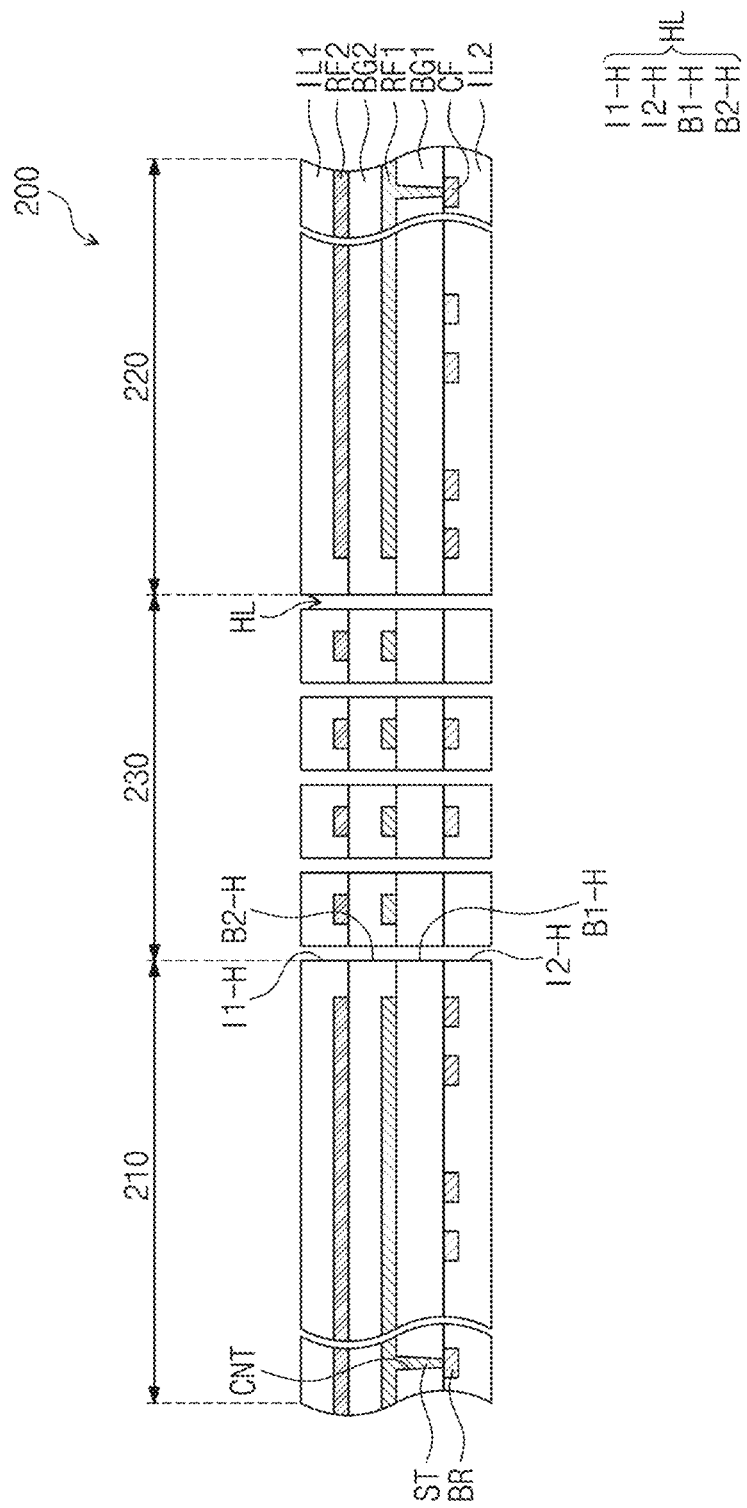
FIG. 6A is a cross-sectional view of a digitizer according to an embodiment of the invention.
Figure 6B:
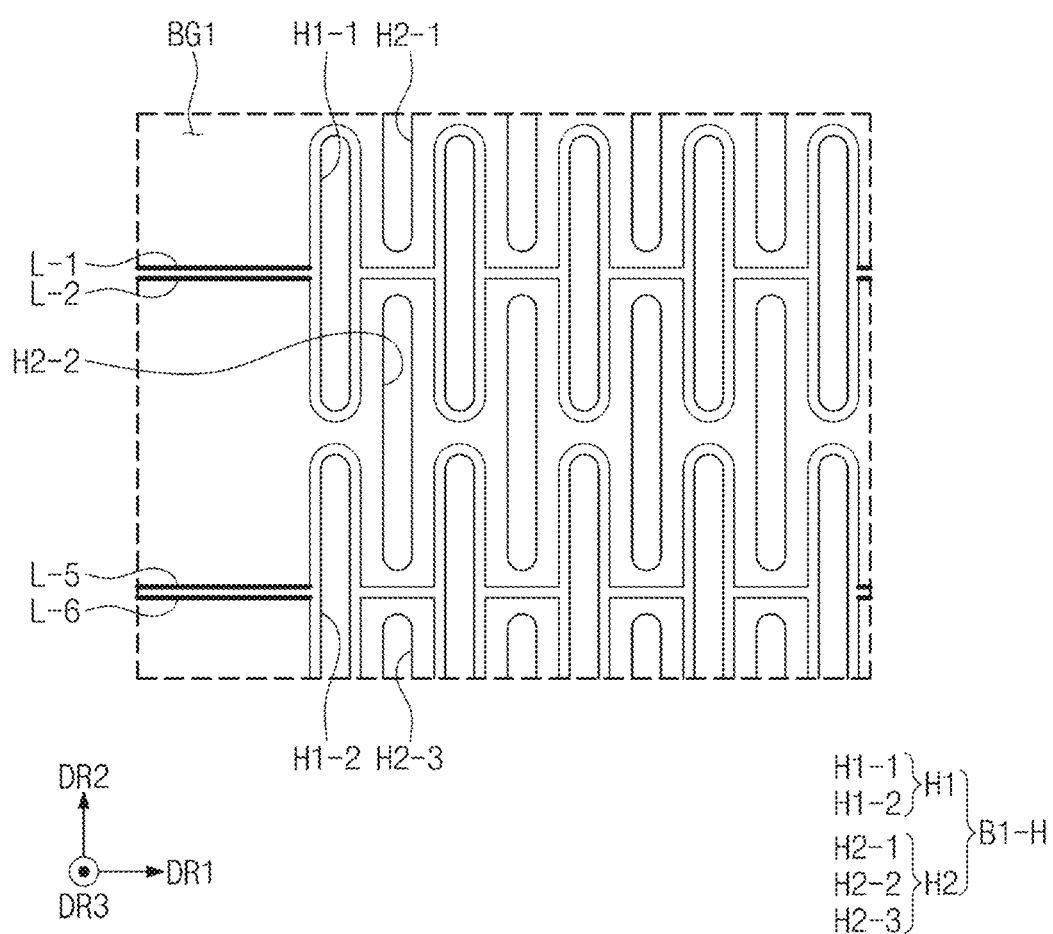
FIG. 6B is a plan view of a digitizer according to an embodiment of the invention.
Figure 6C:
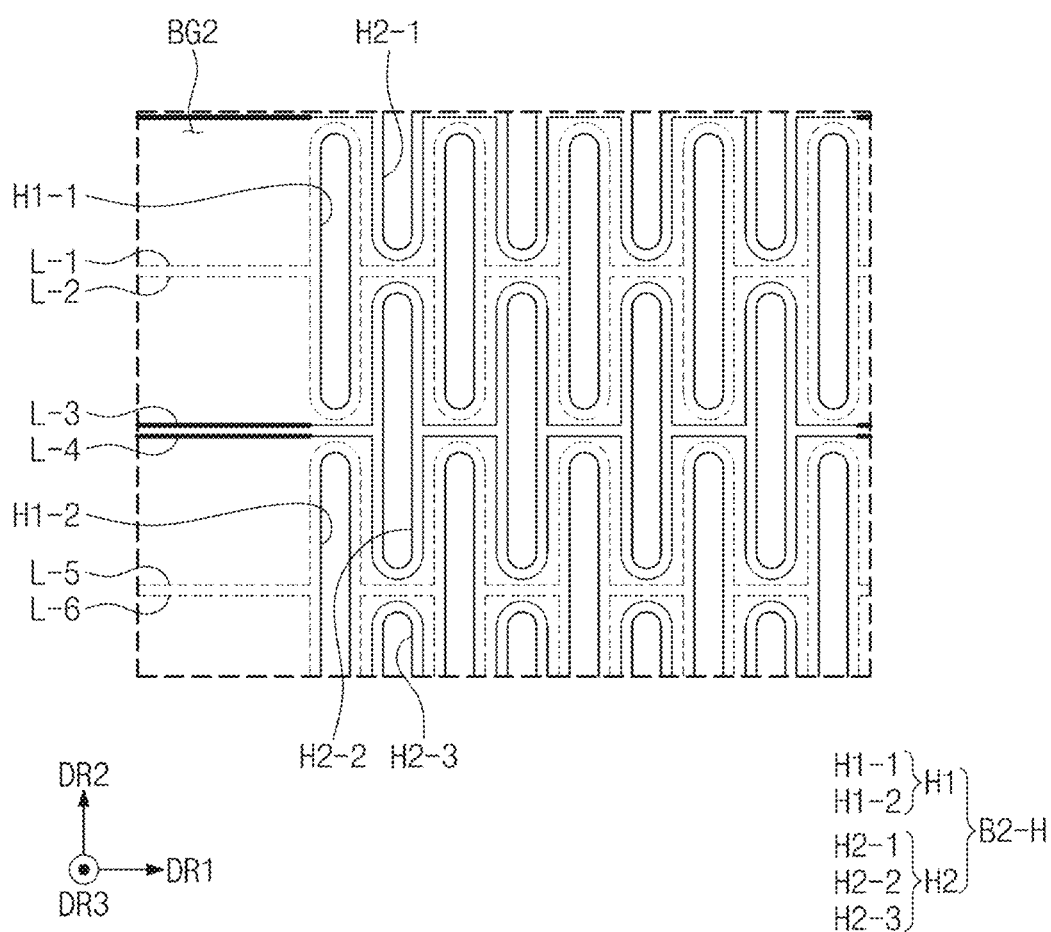
FIG. 6C is a plan view of a digitizer according to an embodiment of the invention.

FIG. 5 is an enlarged plan view of the area AN of FIG. 4A. FIG. 6A is a cross-sectional view of a digitizer according to an embodiment of the invention. FIG. 6B is a plan view of a digitizer according to an embodiment of the invention. FIG. 6C is a plan view of a digitizer according to an embodiment of the invention. The same or likes reference numerals are used in FIGS. 5 to 6C to label the same or like components as those described above with reference to FIGS. 1A to 4B, and any repetitive detailed description will be omitted or simplified.

FIG. 5 illustrates patterns of the sensing coils without layer distinction when the digitizer 200 is viewed in a plan view.

FIG. 5 exemplarily illustrates first to sixth lines L-1 to L-6 included in a first group coil, i.e., a coil in a first group. Each of the first to sixth lines L-1 to L-6 may correspond to a corresponding one of the first sensing coils RF described with reference to FIG. 4A. Accordingly, portions of the first to sixth lines L-1 to L-6 disposed in the first and second non-folding parts 210 and 220 may respectively correspond to the first portion R1 and the second portion R2, and portions of the first to sixth lines L-1 to L-6 disposed in the folding part 230 may correspond to the third portion R3.

The portions of the first to sixth lines L-1 to L-6 disposed in the first and second non-folding parts 210 and 220 may each extend in the first direction DR1 and may be arranged to be spaced apart from each other in the second direction DR2. In an embodiment, for example, when viewed in a plan view, the portions of the first and second lines L-1 and L-2 may be disposed adjacent to each other, the portions of the third and fourth lines L-3 and L-4 may be disposed adjacent to each other, and the portions of the fifth and sixth lines L-5 and L-6 may be disposed adjacent to each other.

A separation distance in the second direction DR2 between the second line L-2 and the third line L-3 (e.g., DS-L in FIG. 5) may be longer than a separation distance in the second direction DR2 between the first line L-1 and the second line L-2. In addition, a separation distance in the second direction DR2 between the fourth line L-4 and the fifth line L-5 may be longer than a separation distance in the second direction DR2 between the third line L-3 and the fourth line L-4.

Each of the holes HL defined in the folding part 230 may have a first width WD1 in the first direction DR1. The first width WD1 may be in a range of about 0.1 mm to about 0.5 mm. Each of the holes HL may have a second width WD2 in the second direction DR2. The second width WD2 may be in a range of about 4 mm to about 10 mm.

In an embodiment, the holes HL may include first group holes (or holes in a first group) H1 and second group holes (or holes in a second group) H2. In an embodiment, for example, each of the first group holes H1 may include a first first hole (hereinafter, will be referred to as "(1-1)-th hole") H1-1 and a second first hole (hereinafter, will be referred to as "(1-2)-th hole") H1-2 arranged in the second direction DR2. Each of the second group holes H2 may be spaced apart from a corresponding one of the first group holes H1 in the first direction DR1 and may include a first second hole (hereinafter, will be referred to as "(2-1)-th hole") H2-1, a second second hole (hereinafter, will be referred to as "(2-2)-th hole") H2-2, and a third second hole (hereinafter, will be referred to as "(2-3)-th hole") H2-3 arranged in the second direction DR2.

In an embodiment, the second group hole H2 may be shifted from the first group hole H1 in the second direction DR2 by a predetermined distance. According to an embodiment, the distance of the shift may be shorter than half of the second width WD2. Accordingly, the shape of a remaining portion of the folding part 230 obtained by excluding the holes HL may have a slit shape of a grid pattern.

According to an embodiment, a first separation distance DS-A between holes overlapping or aligned in the first direction DR1 among the holes included in adjacent group holes, for example, the first separation distance DS-A in the first direction DR1 between the (1-1)-th hole H1-1 of the first group hole H1 and the (2-1)-th hole H2-1 of the second group hole H2, may be in a range of about 0.1 mm to about 0.3 mm.

A second separation distance DS-H in the second direction DR2 between holes HL adjacent to each other in the second direction DR2 among the holes included in a same group hole, for example, the second separation distance DS-H in the second direction DR2 between the (1-1)-th hole H1-1 and the (1-2)-th hole H1-2 included in the first group hole H1, may be in a range of about 0.1 mm to about 0.3 mm.

According to an embodiment, the separation distance DS-L in the second direction DR2 between the second line L-2 and the third line L-3 may be shorter than half of the sum of the second width WD2 and the second separation distance DS-H.

The portions of the first to sixth lines L-1 to L-6 disposed in the folding part 230 may be constituted of a plurality of pattern portions PP. One of the pattern portions PP may include a first first pattern (hereinafter, will be referred to as "(1-1)-th pattern") P1-1, a second first pattern (hereinafter, will be referred to as "(1-2)-th pattern") P1-2, a second pattern P2, and a third pattern P3.

The (1-1)-th pattern P1-1 and the (1-2)-th pattern P1-2 may each extend in the second direction DR2 and may be spaced apart from each other in the first direction DR1 with a corresponding hole HL of the holes HL interposed therebetween. The second pattern P2 may be connected to one end of each of the (1-1)-th pattern P1-1 and the (1-2)-th pattern P1-2 to connect the (1-1)-th pattern P1-1 and the (1-2)-th pattern P1-2 to each other.

One end of the third pattern P3 may be connected to the other end of the (1-2)-th pattern P1-2, and the other end of the third pattern P3 may be connected to the other end of the (1-1)-th pattern P1-1 of another one of the pattern portions PP directly connected thereto.

Referring to FIG. 6A, the digitizer 200 according to an embodiment may include a first base layer BG1, a second base layer BG2, a first first coil (hereinafter, will be referred to as "(1-1)-th coil") RF1 of the first group coil, a second first coil (hereinafter, will be referred to as "(1-2)-th coil") RF2 of the first group coil, a second coil CF of a second group coil, a first insulating layer IL', and a second insulating layer IL2.

The (1-1)-th coil RF1 may be disposed on a front surface of the first base layer BG1. The second coil CF may be disposed on a rear surface of the first base layer BG1. First base holes B1-H may be defined in the first base layer BG1 by extending from the front surface to the rear surface thereof or penetrating the first base layer BG1.

The second base layer BG2 may be disposed on the front surface of the first base layer BG1 to cover the (1-1)-th coil RF1. The (1-2)-th coil RF2 of the first group coil may be disposed on the second base layer BG2. Second base holes B2-H may be defined in the second base layer BG2 by extending from a front surface to a rear surface thereof or penetrating the second base layer BG2.

The first insulating layer IL1 may be disposed on the front surface of the second base layer BG2 to cover the (1-2)-th coil RF2. First cover holes I1-H may be defined in the first insulating layer IL1 by extending from a front surface to a rear surface thereof or penetrating the first insulating layer IL1.

The second insulating layer IL2 may be disposed on the rear surface of the first base layer BG1 to cover the second coil CF. Second cover holes I2-H may be defined in the second insulating layer IL2 extending from a front surface to a rear surface thereof or penetrating the second insulating layer IL2.

Each of the holes HL defined in the folding part 230 may be a hole provided by aligning inner surfaces defining a corresponding one of the first base holes B1-H, a corresponding one of the second base holes B2-H, a corresponding one of the first cover holes I1-H, and a corresponding one of the second cover holes I2-H with each other.

A portion of the (1-1)-th coil RF1 disposed near an outer edge of the first non-folding part 210 may be connected to the bridge pattern BR disposed on the rear surface of the first base layer BG1 through a connection pattern ST disposed in a contact hole CNT. A connection relationship between the bridge pattern BR and the (1-1)-th and (1-2)-th patterns R1-1 and R1-2 described with reference to FIG. 4A may be substantially the same as that described above.

Referring to FIGS. 6B and 6C, the first and second lines L-1 and L-2 and the fifth and sixth lines L-5 and L-6 among the first group coil described with reference to FIG. 5 may be disposed on the first base layer BG1, and the third and fourth lines L-3 and L-4 among the first group coil may be disposed on the second base layer BG2. Accordingly, in such an embodiment, the lines on the first base layer BG1 or the second base layer BG2 may have an arrangement structure which repeats on the basis of the four lines arranged in the second direction DR2.

As illustrated in FIG. 6B, a portion of the first line L-1 disposed on the first base layer BG1 in the folding part 230 may surround a portion of each of (1-1)-th holes H1-1 respectively included in different columns among the first base holes B1-H defined in the first base layer BG1.

A portion of the fifth line L-5 disposed on the first base layer BG1 in the folding part 230 may surround a portion of each of (1-2)-th holes H1-2 respectively included in different columns among the first base holes B1-H defined in the first base layer BG1.

A portion of the second line L-2 disposed on the first base layer BG1 in the folding part 230 may surround the remaining portion of each of the (1-1)-th holes H1-1 respectively included in different columns among the first base holes B1-H defined in the first base layer BG1.

A portion of the sixth line L-6 disposed on the first base layer BG1 in the folding part 230 may surround the remaining portion of each of the (1-2)-th holes H1-2 respectively included in different columns among the first base holes B1-H defined in the first base layer BG1.

As illustrated in FIG. 6C, a portion of the third line L-3 disposed on the second base layer BG2 in the folding part 230 may surround a portion of each of (2-2)-th holes H2-2 respectively included in different columns among the second base holes B2-H defined in the second base layer BG2.

A portion of the fourth line L-4 disposed on the second base layer BG2 in the folding part 230 may surround the remaining portion of each of the (2-2)-th holes H2-2 respectively included in the different columns among the second base holes B2-H defined in the second base layer BG2.

According to an embodiment, as shown in FIG. 5, four lines of the first group coil may pass or extend between adjacent holes in the second direction DR2. In such an embodiment, the first and second base layers BG1 and BG2 are provided separately, such that two or fewer lines may pass between adjacent holes in the second direction DR2 as shown in FIGS. 6B and 6C.

That is, according to an embodiment, the number of the third portions R3 (see FIG. 4A) disposed between adjacent holes in the second direction DR2 among the holes defined in the folding part 230 may be two or fewer on any one of the base layers.

According to an embodiment of the invention, by reducing the number of the lines passing between adjacent holes among the holes defined in the folding part 230, a line width (or a surface area of a cross section) of each of the lines passing between the holes may be increased, and thus resistance of each of the sensing coils may be reduced. In such an embodiment, by disposing the sensing coils also in the folding part 230, the electronic apparatus with improved sensing sensitivity in the folding part 230 may be provided.

Figure 7A:
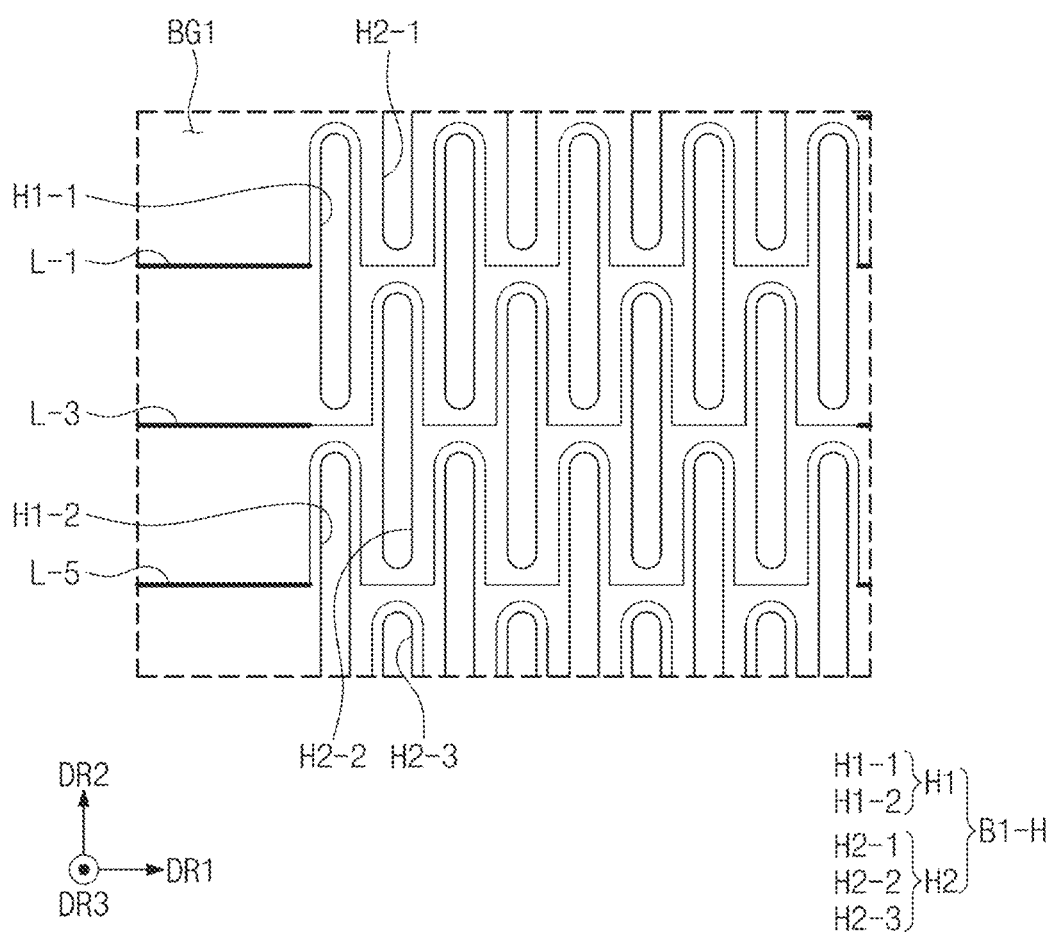
FIG. 7A is a plan view of a digitizer according to an embodiment of the invention.
Figure 7B:
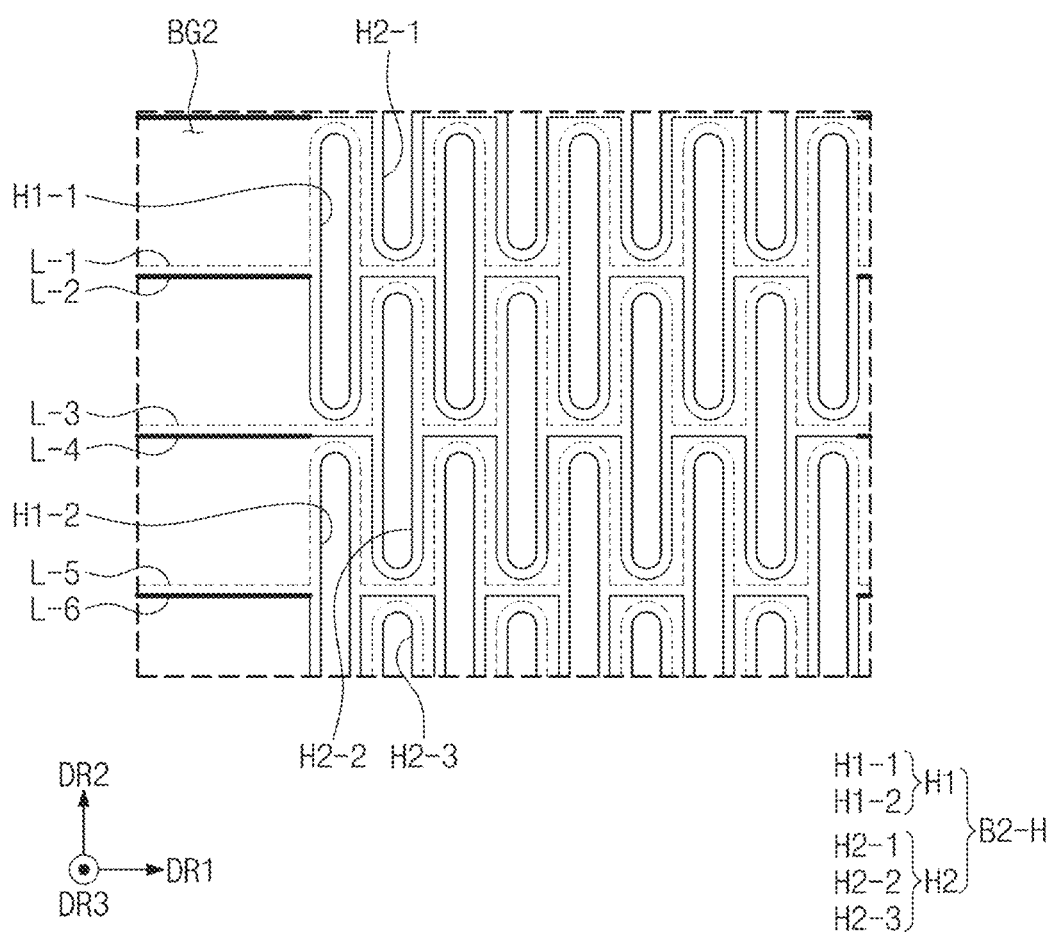
FIG. 7B is a plan view of a digitizer according to an embodiment of the invention.

FIG. 7A is a plan view of a digitizer according to an embodiment of the invention. FIG. 7B is a plan view of a digitizer according to an embodiment of the invention. The same or like reference numerals are used in FIGS. 7A and 7B to label the same or like components as those described above with reference to FIGS. 5 to 6C, and any repetitive detailed description will be omitted or simplified.

Referring to FIGS. 7A and 7B, in an embodiment, first, third, and fifth lines L-1, L-3, and L-5 among a first group coil described with reference to FIG. 5 may be disposed on a first base layer BG1, and second, fourth, and sixth lines L-2, L-4, and L-6 among the first group coil may be disposed on a second base layer BG2.

Accordingly, odd-numbered lines of the lines arranged in a second direction DR2 may be disposed on the first base layer BG1, and even-numbered lines thereof may be disposed on the second base layer BG2.

As illustrated in FIG. 7A, a portion of the first line L-1 disposed on the first base layer BG1 in a folding part 230 may surround a portion of each of (1-1)-th holes H1-1 respectively included in different columns among first base holes B1-H defined in the first base layer BG1.

A portion of the third line L-3 disposed on the first base layer BG1 in the folding part 230 may surround a portion of each of (2-2)-th holes H2-2 respectively included in different columns among the first base holes B1-H defined in the first base layer BG1.

A portion of the fifth line L-5 disposed on the first base layer BG1 in the folding part 230 may surround a portion of each of (1-2)-th holes H1-2 respectively included in different columns among the first base holes B1-H defined in the first base layer BG1.

As illustrated in FIG. 7B, a portion of the second line L-2 disposed in the folding part 230 may surround a portion of each of (1-1)-th holes H1-1 respectively included in different columns among second base holes B2-H defined in the second base layer BG2.

A portion of the fourth line L-4 disposed on the second base layer BG2 in the folding part 230 may surround a portion of each of (2-2)-th holes H2-2 respectively included in different columns among the second base holes B2-H defined in the second base layer BG2.

A portion of the sixth line L-6 disposed on the second base layer BG2 in the folding part 230 may surround a portion of each of (1-2)-th holes H1-2 respectively included in different columns among the second base holes B2-H defined in the second base layer BG2.

According to an embodiment, when viewed in a plan view or in the third direction DR3, four lines of the first group coil may pass between adjacent holes in the second direction DR2. However, in such an embodiment, the first and second base layers BG1 and BG2 are provided separately, and two or fewer lines may pass between adjacent holes in the second direction DR2.

Figure 8:
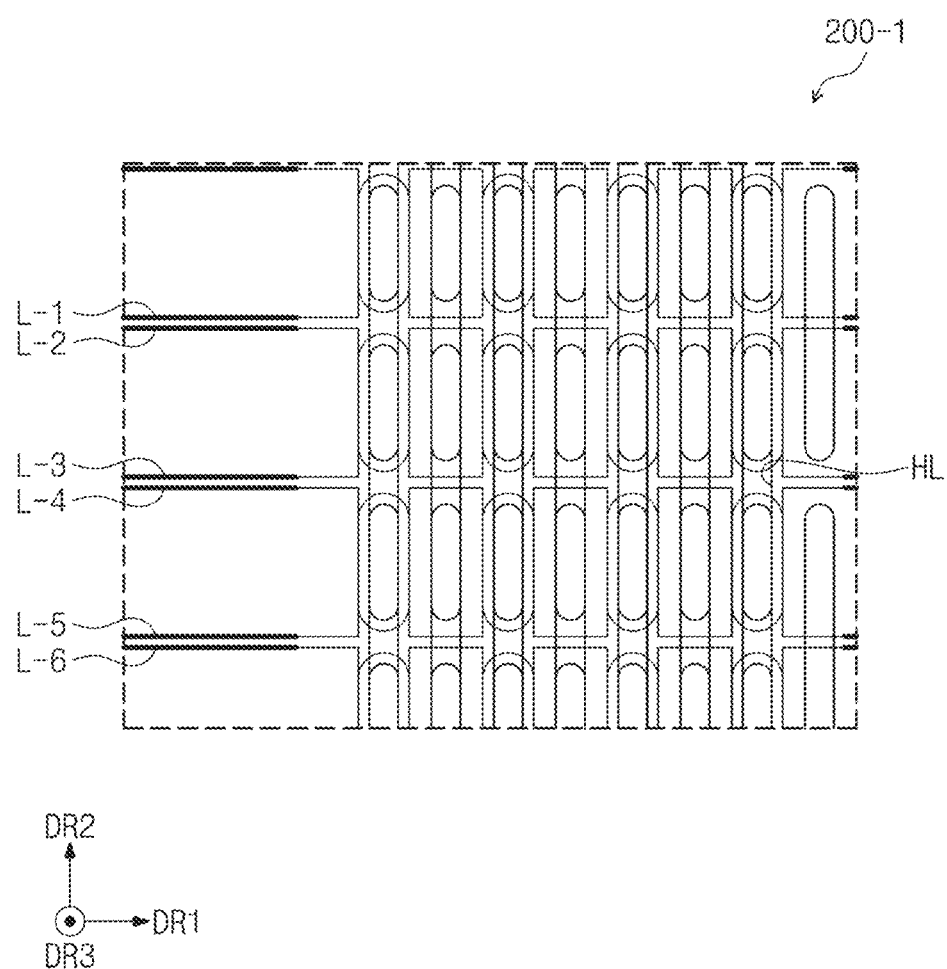
FIG. 8 is a plan view of a digitizer according to an embodiment of the invention.
Figure 9A:
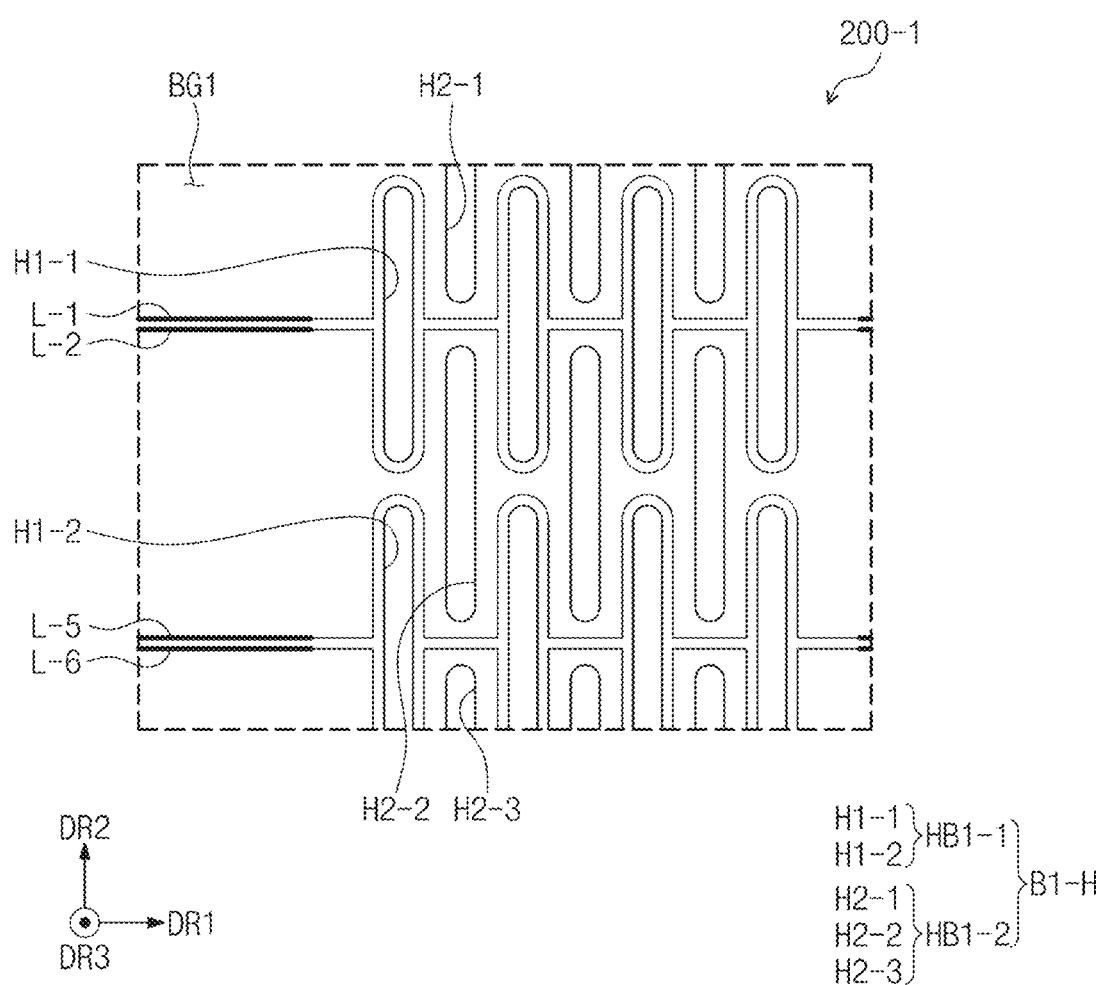
FIG. 9A is a plan view of a digitizer according to an embodiment of the invention.
Figure 9B:
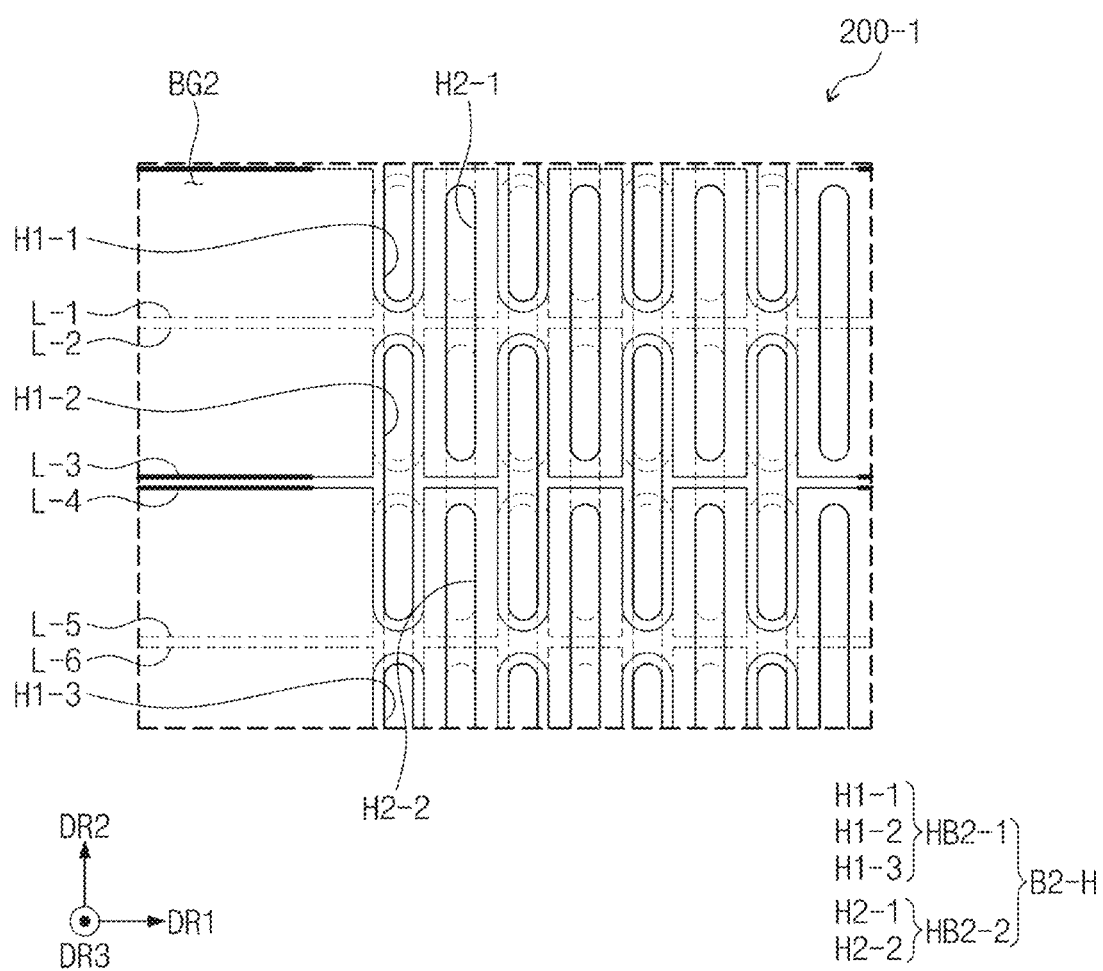
FIG. 9B is a plan view of a digitizer according to an embodiment of the invention.

FIG. 8 is a plan view of a digitizer according to an embodiment of the invention. FIG. 9A is a plan view of a digitizer according to an embodiment of the invention. FIG. 9B is a plan view of a digitizer according to an embodiment of the invention. The same or like reference numerals are used in FIGS. 8 to 9B to label the same or like components as those described above with reference to FIGS. 5 to 6C, and any repetitive detailed description will be omitted or simplified.

A digitizer 200-1 according to an embodiment may include first to sixth lines L-1 to L-6, a first base layer BG1 (see FIG. 6A), and a second base layer BG2 (see FIG. 6A). According to an embodiment, holes HL respectively defined in the first and second base layers BG1 and BG2 may not completely overlap each other when viewed in a plan view.

Referring to FIG. 9A, first base holes B1-H defined in the first base layer BG1 may include first group holes HB1-1 and second group holes HB1-2.

Each of the first group holes HB1-1 may include a (1-1)-th hole H1-1 and a (1-2)-th hole H1-2 arranged in a second direction DR2. Each of the second group holes HB1-2 may be spaced apart from a corresponding one of the first group holes HB1-1 in a first direction DR1 and may include a (2-1)-th hole H2-1, a (2-2)-th hole H2-2, and a (2-3)-th hole H2-3 arranged in the second direction DR2.

The first and second lines L-1 and L-2 and the fifth and sixth lines L-5 and L-6 among a first group coil may be disposed on the first base layer BG1.

A portion of the first line L-1 disposed on the first base layer BG1 in a folding part 230 may surround a portion of each of (1-1)-th holes H1-1 respectively included in different columns among the first base holes B1-H defined in the first base layer BG1.

A portion of the fifth line L-5 disposed on the first base layer BG1 in the folding part 230 may surround a portion of each of (1-2)-th holes H1-2 respectively included in different columns among the first base holes B1-H defined in the first base layer BG1.

A portion of the second line L-2 disposed on the first base layer BG1 in the folding part 230 may surround the remaining portion of each of the (1-1)-th holes H1-1 respectively included in different columns among the first base holes B1-H defined in the first base layer BG1.

A portion of the sixth line L-6 disposed on the first base layer BG1 in the folding part 230 may surround the remaining portion of each of the (1-2)-th holes H1-2 respectively included in different columns among the first base holes B1-H defined in the first base layer BG1.

Referring to FIG. 9B, second base holes B2-H defined in the second base layer BG2 may include first group holes HB2-1 and second group holes HB2-2.

Each of the first group holes HB2-1 may include a (1-1)-th hole H1-1, a (1-2)-th hole H1-2, and a (1-3)-th hole H1-3 arranged in the second direction DR2. Each of the second group holes HB2-2 may be spaced apart from a corresponding one of the first group holes HB2-1 in the first direction DR1 and may include a (2-1)-th hole H2-1 and a (2-2)-th hole H2-2 arranged in the second direction DR2.

The third and fourth lines L-3 and L-4 of the first group coil may be disposed on the second base layer BG2.

A portion of the third line L-3 disposed on the second base layer BG2 in the folding part 230 may surround a portion of each of (1-2)-th holes H1-2 respectively included in different columns among the second base holes B2-H defined in the second base layer BG2.

A portion of the fourth line L-4 disposed on the second base layer BG2 in the folding part 230 may surround the remaining portion of each of the (1-2)-th holes H1-2 respectively included in different columns among the second base holes B2-H defined in the second base layer BG2.

According to this embodiment, the holes respectively defined in the layers different from each other may be shifted by a predetermined distance. In an embodiment, for example, the (1-2)-th hole H1-2 defined in the second base layer BG2 may be shifted in the second direction DR2 from the (1-1)-th hole H1-1 defined in the first base layer BG1.

Accordingly, the (1-2)-th hole H1-2 defined in the second base layer BG2 may overlap at least a portion of each of the (1-1)-th hole H1-1 and the (1-2)-th hole H1-2 defined in the first base layer BG1 and may also overlap an area between the (1-1)-th hole H1-1 and the (1-2)-th hole H1-2 where the (1-1)-th hole H1-1 and the (1-2)-th hole H1-2 are spaced apart from each other.

In an embodiment, as described with reference to FIG. 5, four lines pass between adjacent holes, in a state in which the base layers are laminated. In an alternative embodiment, as shown in FIGS. 9A and 9B, two lines may pass between adjacent holes, when viewed in a plan view, in a state in which the base layers are laminated.

FIGS. 10A to 10H are cross-sectional views for describing a method of manufacturing a digitizer according to an embodiment of the invention. The same or like reference numerals are used in FIGS. 10A to 10H to label the same or like components as those described above with reference to FIGS. 1A to 9B, and any repetitive detailed description will be omitted or simplified.

Hereinafter, the method of manufacturing a digitizer according to an embodiment will be described with reference to FIGS. 10A to 10H.

Figure 10A:
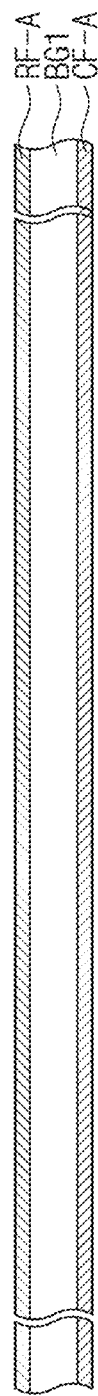
FIGS. 10A to 10H are cross-sectional views for describing a method of manufacturing a digitizer according to an embodiment of the invention.

Referring to FIG. 10A, a first conductive layer RF-A may be provided or formed on a front surface of a first base layer BG1, and a second conductive layer CF-A may be provided or formed on a rear surface of the first base layer BG1. The first conductive layer RF-A and the second conductive layer CF-A may include copper.

Figure 10B:
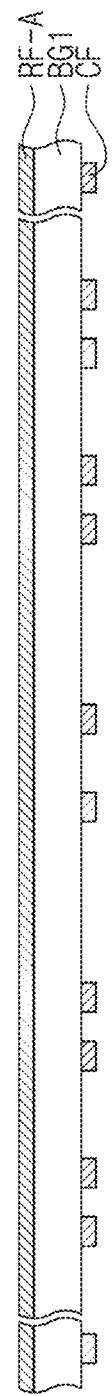

Thereafter, referring to FIG. 10B, the method may include patterning the second conductive layer CF-A. A second coil CF of a second group coil may be formed by the patterning of the second conductive layer CF-A.

Figure 10C:
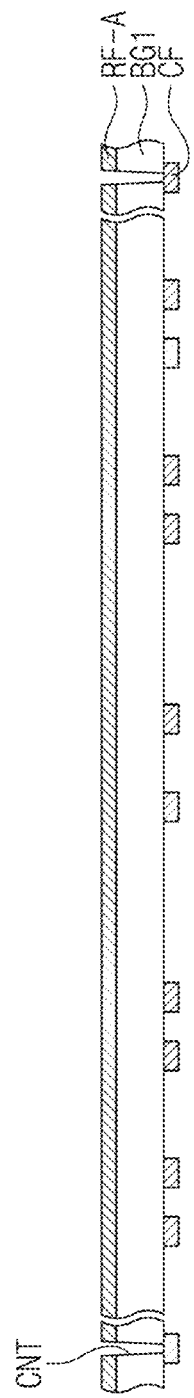

Thereafter, referring to FIG. 10C, the method may include forming a contact hole CNT in the first base layer BG1. The contact hole CNT may be formed to extend through the first base layer BG1 in a thickness direction thereof from the front surface to the rear surface thereof.

Figure 10D:
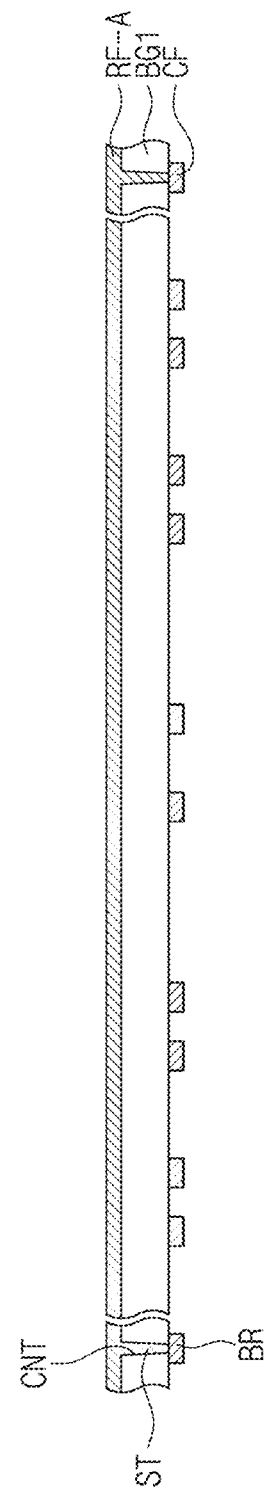

Thereafter, referring to FIG. 10D, the method may include providing or forming a connection pattern ST. The connection pattern ST may be formed by performing a plating process on a (1-1)-th coil RF1 and thus filling the inside of the contact hole CNT with a metal material. The (1-1)-th coil RF1 may be connected to a bridge pattern BR disposed on the rear surface of the first base layer BG1 through the connection pattern ST. This may correspond to the connection relationship between the bridge pattern BR and the (1-1)-th and (1-2)-th patterns R1-1 and R1-2 described with reference to FIG. 4A.

Figure 10E:
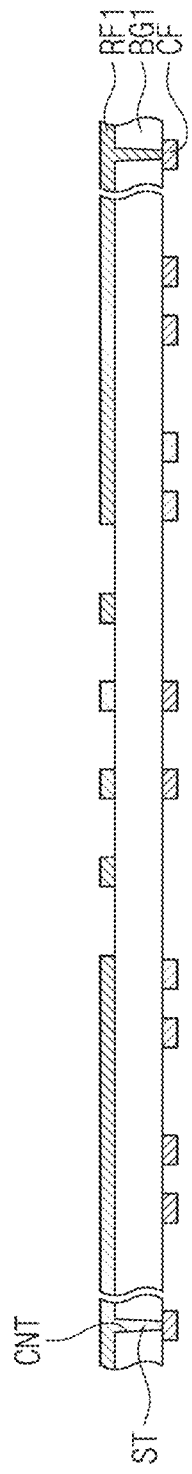

Thereafter, referring to FIG. 10E, the method may include patterning the first conductive layer RF-A. The (1-1)-th coil RF1 of a first group coil may be formed by the patterning of the first conductive layer RF-A.

The (1-1)-th coil RF1 may correspond to any one of the first and second lines L-1 and L-2 and the fifth and sixth lines L-5 and L-6 among the first group coil described with reference to FIG. 6B.

Figure 10F:
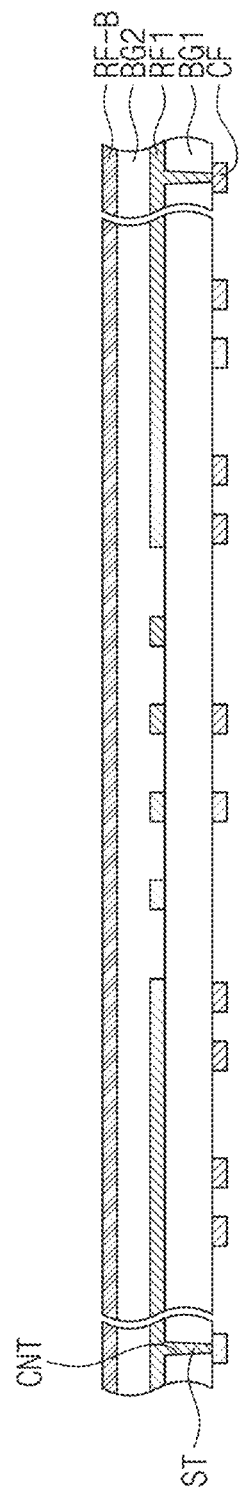

Thereafter, referring to FIG. 10F, the method may further include providing or forming a second base layer BG2. The second base layer BG2 may be provided or formed on the front surface of the first base layer BG1 to cover the (1-1)-th coil RF1. Thereafter, the method may include providing or forming a conductive layer RF-B on the second base layer BG2. The conductive layer RF-B may include copper.

Figure 10G:
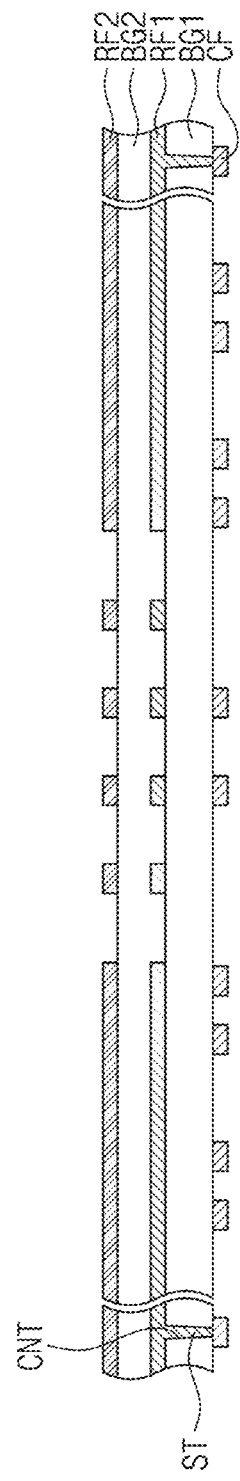

Thereafter, referring to FIG. 10G, the method may include patterning the conductive layer RF-B. A (1-2)-th coil RF2 of the first group coil may be formed by the patterning of the conductive layer RF-B.

The (1-2)-th coil RF2 may correspond to any one of the third and fourth lines L-3 and L-4 among the first group coil described with reference to FIG. 6C.

Figure 10H:
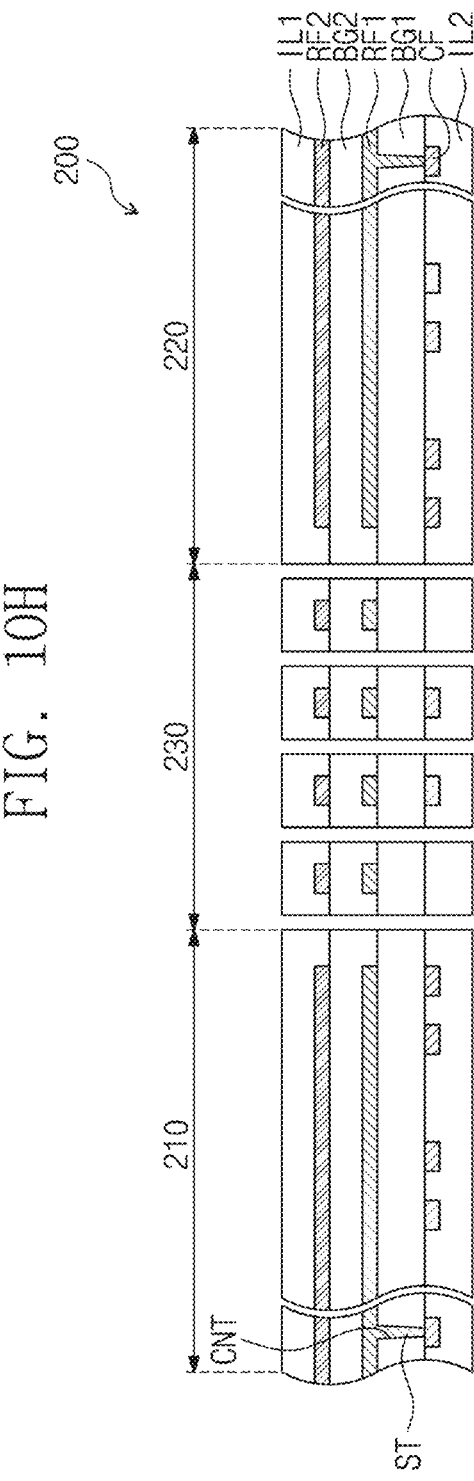

Thereafter, referring to FIG. 10H, the method may include providing or forming insulating layers IL1 and IL2. A first insulating layer IL1 may be provided or formed on a front surface of the second base layer BG2 to cover the (1-2)-th coil RF2. A second insulating layer IL2 may be provided or formed on the rear surface of the first base layer BG1 to cover the second coil CF of the second group coil. The insulating layers IL1 and IL2 may include at least one selected from an inorganic material and an organic material.

Thereafter, the method may include forming holes HL. The holes HL may be formed through the base layers BG1 and BG2 and the insulating layers IL1 and IL2. The holes HL may be defined in a folding part 230 of a digitizer 200.

As the holes HL are defined in the folding part 230 of the digitizer 200 according to an embodiment of the invention, the shape of an electronic apparatus 1000 (see FIG. 1A) may be easily changed during a folding operation of the electronic apparatus 1000. In addition, as the digitizer 200 according to an embodiment of the invention includes the coils formed in the folding part 230, it is possible to provide the electronic apparatus in which the sensing sensitivity of the folding part 230 is improved.

FIG. 11A is a cross-sectional view of a base layer according to an embodiment of the invention. FIG. 11B is a plan view of a base layer according to an embodiment of the invention. The same or like reference numerals are used to label the same or like components as those described above with reference to FIGS. 1A to 10H, and any repetitive detailed description will be omitted or simplified.

Referring to FIGS. 11A and 11B, a base layer BG according to an embodiment of the invention may include a matrix MT including a filler and fiber lines FL1 and FL2 that have a woven shape and are disposed inside the matrix MT. The base layer BG may correspond to each of the above-described base layers BG1 and BG2.

The fiber lines FL1 and FL2 may be alternately arranged in the first direction DR1 and the second direction DR2 to have a fabric shape when viewed in a plan view. Each of the fiber lines FL1 and FL2 may be provided in the form of a bundle constituted of a plurality of glass fibers GL. A diameter of one of the glass fibers GL included in one of the fiber lines may be in a range of about 3 micrometers (µm) to about 10 µm.

The fiber lines FL1 and FL2 may be made of glass fiber-reinforced plastic (GFRP). The fiber lines FL1 and FL2 may be disposed inside the matrix MT. The matrix MT according to an embodiment may include at least one selected from epoxy, polyester, polyamides, polycarbonates, polypropylene, polybutylene, and vinyl ester.

The matrix MT may include the filler. The filler may include at least one selected from silica, barium sulphate, sintered talc, barium titanate, titanium oxide, clay, alumina, mica, boehmite, zinc borate, and zinc titanate.

According to an embodiment of the invention, each of the base layers BG included in the digitizer 200 (see FIG. 2) may protect the lower portion of the display module 100 (see FIG. 2) when the electronic apparatus 1000 is folded, by including the bundle of the fibers of the glass fiber-reinforced plastic disposed inside the matrix MT.

Accordingly, the digitizer 200 of an embodiment of the invention may be a component that functions as a sensing member while functioning as a protective member. Accordingly, in such an embodiment, a separate metal plate for protecting the display module 100 may be omitted, and a separate digitizer to be disposed in the folding part 230 may be omitted. Accordingly, it is possible to provide the electronic apparatus 1000 that is less costly and slim.

Figure 12:
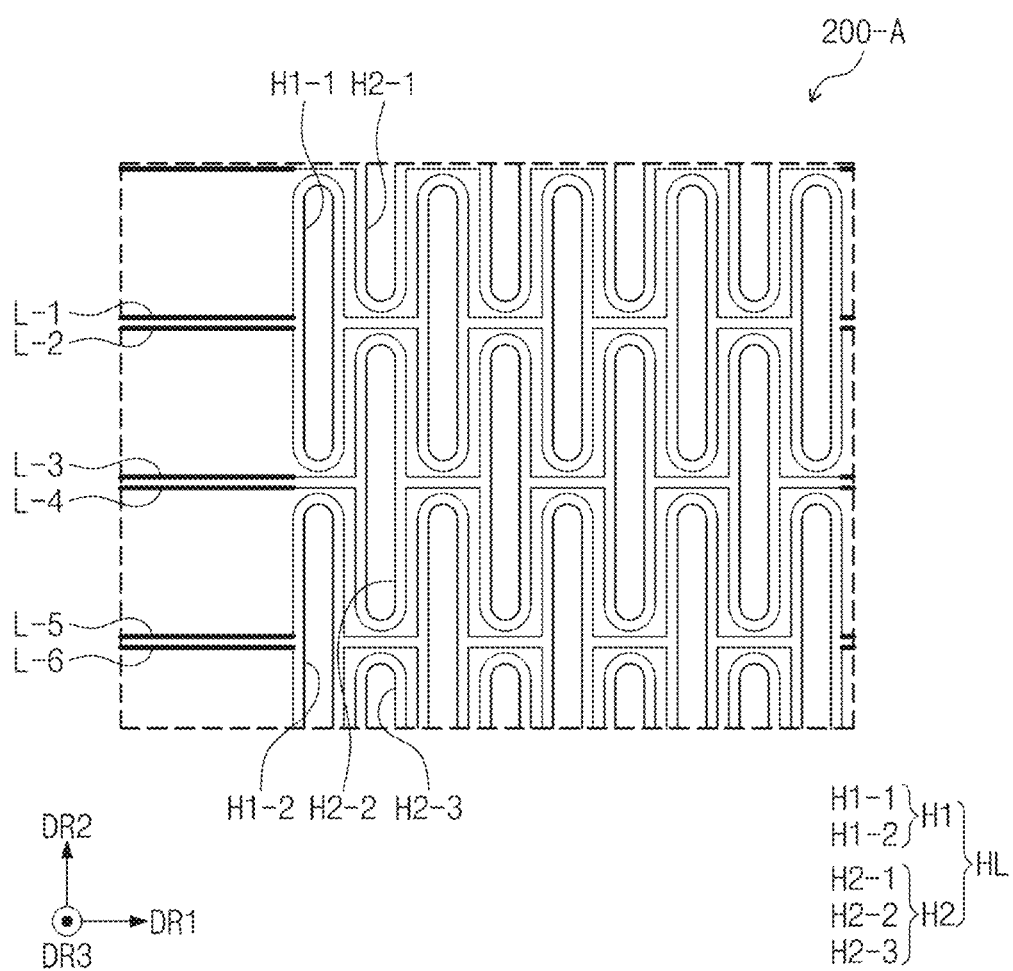
FIG. 12 is a plan view of a digitizer according to an embodiment of the invention.
Figure 13A:
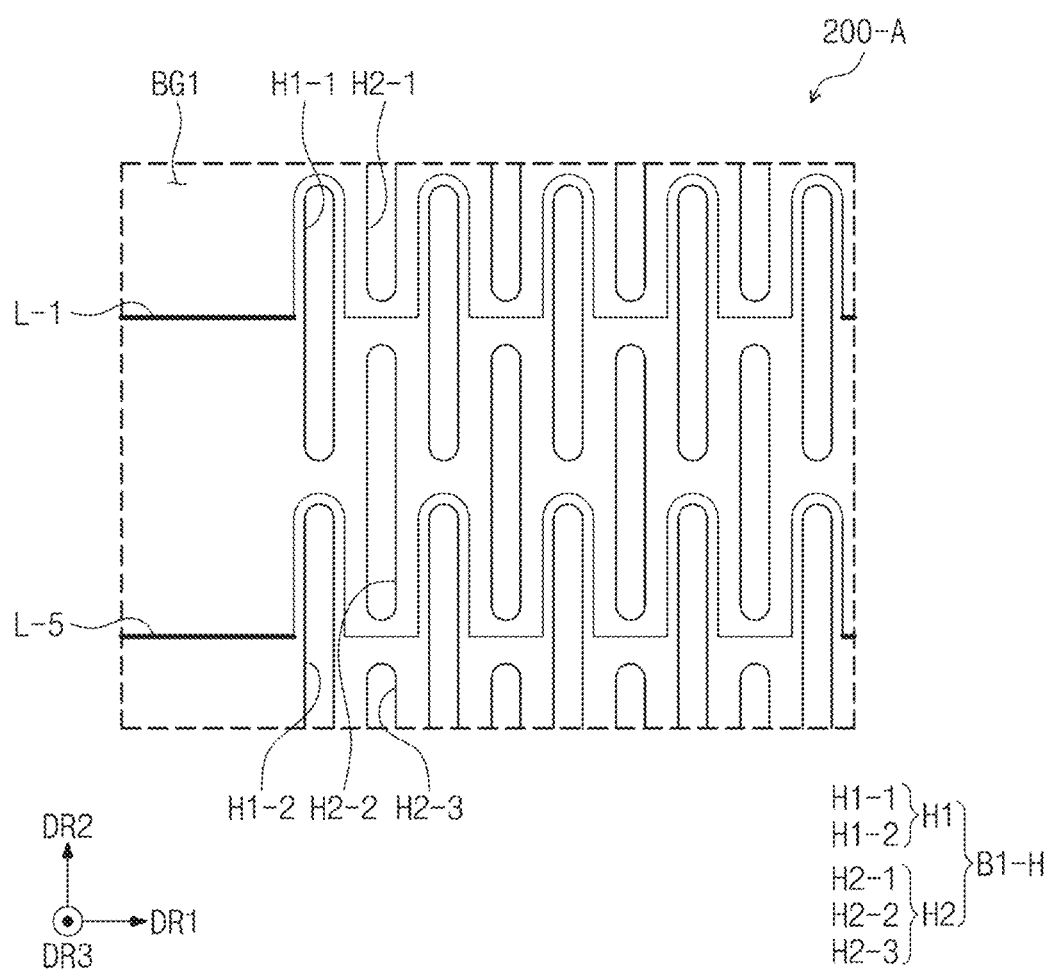
FIG. 13A is a plan view of a digitizer according to an embodiment of the invention.
Figure 13B:
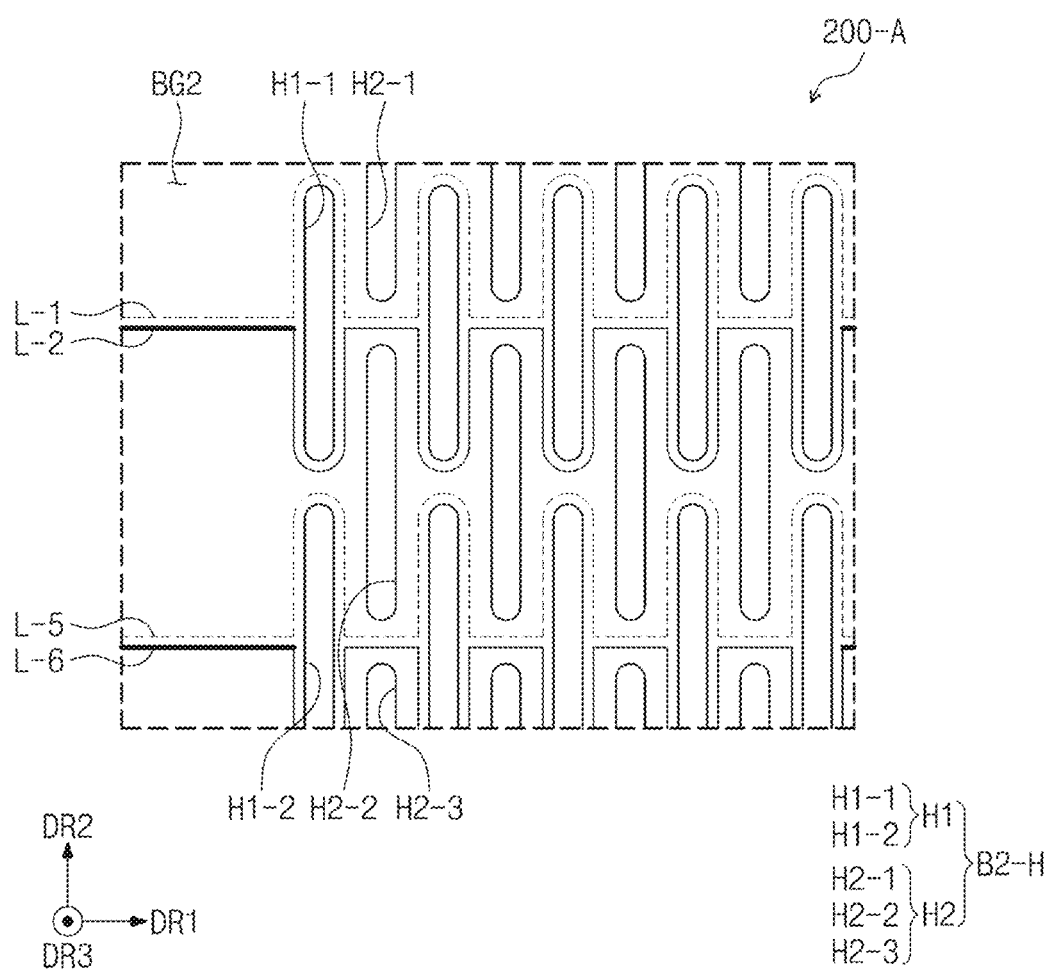
FIG. 13B is a plan view of a digitizer according to an embodiment of the invention.
Figure 13C:
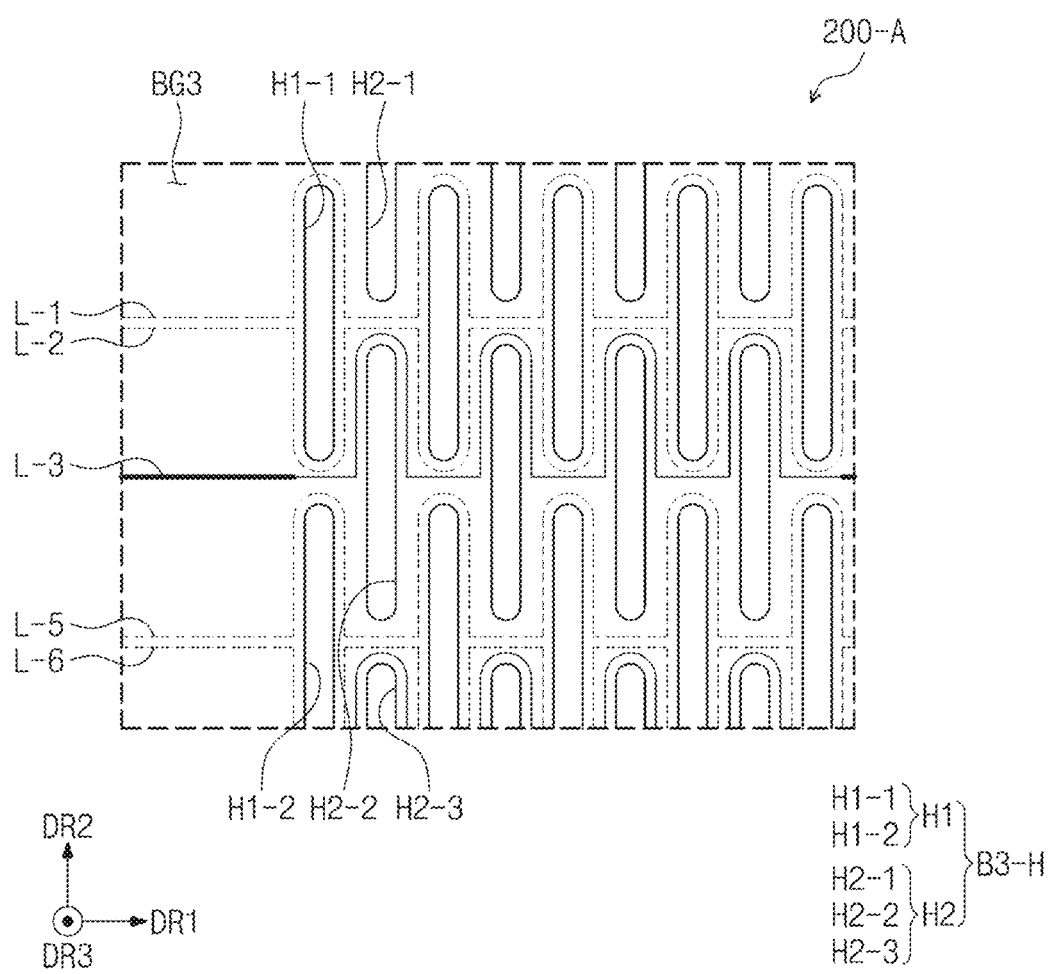
FIG. 13C is a plan view of a digitizer according to an embodiment of the invention.
Figure 13D:
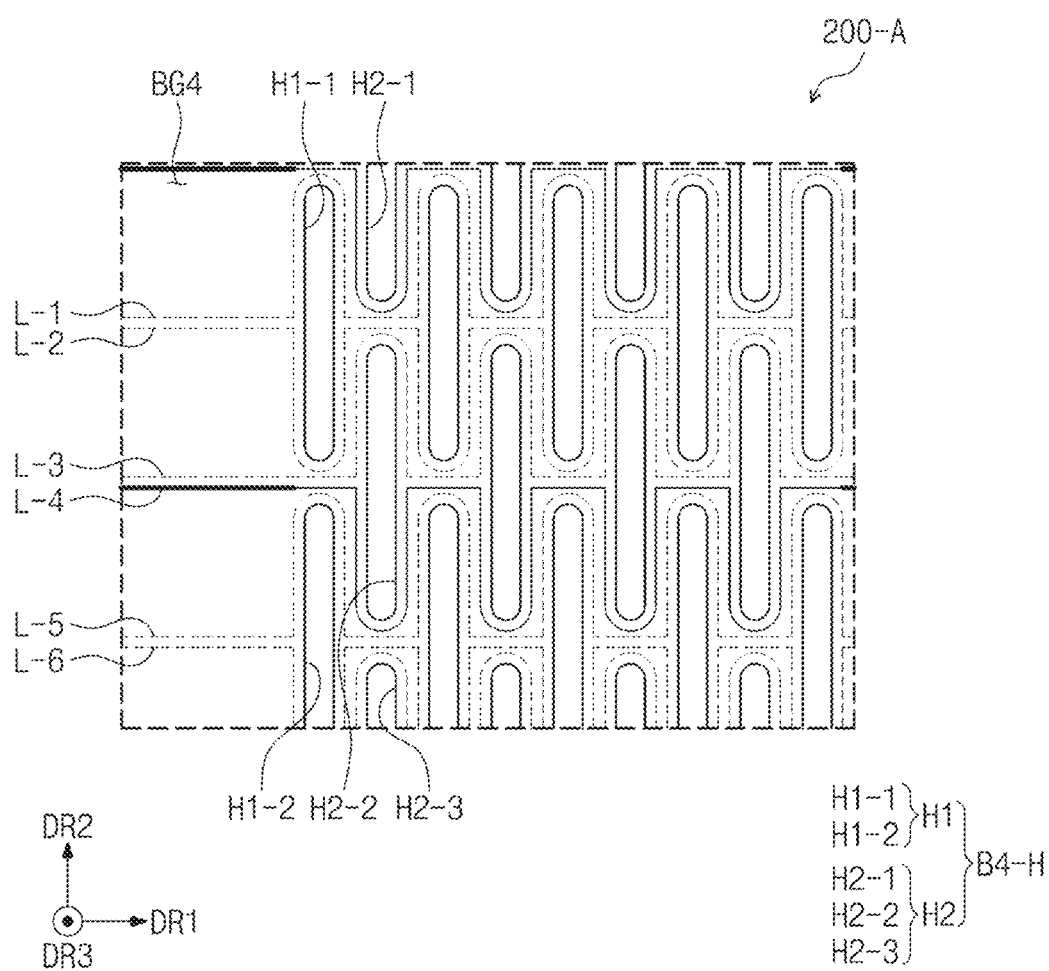
FIG. 13D is a plan view of a digitizer according to an embodiment of the invention.

FIG. 12 is a plan view of a digitizer according to an embodiment of the invention. FIG. 13A is a plan view of a digitizer according to an embodiment of the invention. FIG. 13B is a plan view of a digitizer according to an embodiment of the invention. FIG. 13C is a plan view of a digitizer according to an embodiment of the invention. FIG. 13D is a plan view of a digitizer according to an embodiment of the invention. The same or like reference numerals are used in FIGS. 12 to 13D to label the same or like components as those described above with reference to FIGS. 1A to 10H, and any repetitive detailed description will be omitted or simplified.

FIG. 12 illustrates lines that are disposed on four different layers and thus overlap each other when viewed in the third direction DR3, and FIGS. 13A to 13D each illustrate lines disposed on a corresponding one of the layers.

Referring to FIG. 12, holes HL may be defined in a folding part 230 (see FIG. 4A) of a digitizer 200-A according to an embodiment.

FIG. 12 exemplarily illustrates first to sixth lines L-1 to L-6 included in a first group coil. Each of the first to sixth lines L-1 to L-6 may correspond to one of the first sensing coils RF described with reference to FIG. 4A. Accordingly, portions of the first to sixth lines L-1 to L-6 disposed in first and second non-folding parts 210 and 220 (see FIG. 4A) may respectively correspond to the first portion R1 (see FIG. 4A) and the second portion R2 (see FIG. 4A), and portions of the first to sixth lines L-1 to L-6 disposed in the folding part 230 (see FIG. 4A) may correspond to the third portion R3 (see FIG. 4A).

The holes HL may include first group holes H1 and second group holes H2. In an embodiment, for example, each of the first group holes H1 may include a (1-1)-th hole H1-1 and a (1-2)-th hole H1-2 arranged in a second direction DR2. Each of the second group holes H2 may be spaced apart from a corresponding one of the first group holes H1 in a first direction DR1 and may include a (2-1)-th hole H2-1, a (2-2)-th hole H2-2, and a (2-3)-th hole H2-3 arranged in the second direction DR2.

Referring to FIG. 13A, the first and fifth lines L-1 and L-5 of the first group coil may be disposed on a first base layer BG1.

A portion of the first line L-1 disposed on the first base layer BG1 in the folding part 230 may surround a portion of each of (1-1)-th holes H1-1 respectively included in different columns among first base holes B1-H defined in the first base layer BG1.

A portion of the fifth line L-5 disposed on the first base layer BG1 in the folding part 230 may surround a portion of each of (1-2)-th holes H1-2 respectively included in different columns among the first base holes B1-H defined in the first base layer BG1.

Referring to FIG. 13B, the second and sixth lines L-2 and L-6 of the first group coil may be disposed on a second base layer BG2.

A portion of the second line L-2 disposed on the second base layer BG2 in the folding part 230 may surround a portion of each of (1-1)-th holes H1-1 respectively included in different columns among second base holes B2-H defined in the second base layer BG2.

A portion of the sixth line L-6 disposed on the second base layer BG2 in the folding part 230 may surround a portion of each of (1-2)-th holes H1-2 respectively included in different columns among the second base holes B2-H defined in the second base layer BG2.

Referring to FIG. 13C, the third line L-3 of the first group coil may be disposed on a third base layer BG3.

A portion of the third line L-3 disposed on the third base layer BG3 in the folding part 230 may surround a portion of each of (2-2)-th holes H2-2 respectively included in different columns among third base holes B3-H defined in the third base layer BG3.

Referring to FIG. 13D, the fourth line L-4 of the first group coil may be disposed on a fourth base layer BG4.

A portion of the fourth line L-4 disposed on the fourth base layer BG4 in the folding part 230 may surround a portion of each of (2-2)-th holes H2-2 respectively included in different columns among fourth base holes B4-H defined in the fourth base layer BG4.

In the digitizer 200-A according to an embodiment, when viewed in the third direction DR3, four lines of the first group coil may pass between adjacent holes in the second direction DR2. In such an embodiment, the first to fourth base layers BG1 to BG4 are provided separately, and one line may pass between adjacent holes in the second direction DR2.

Figure 15A:
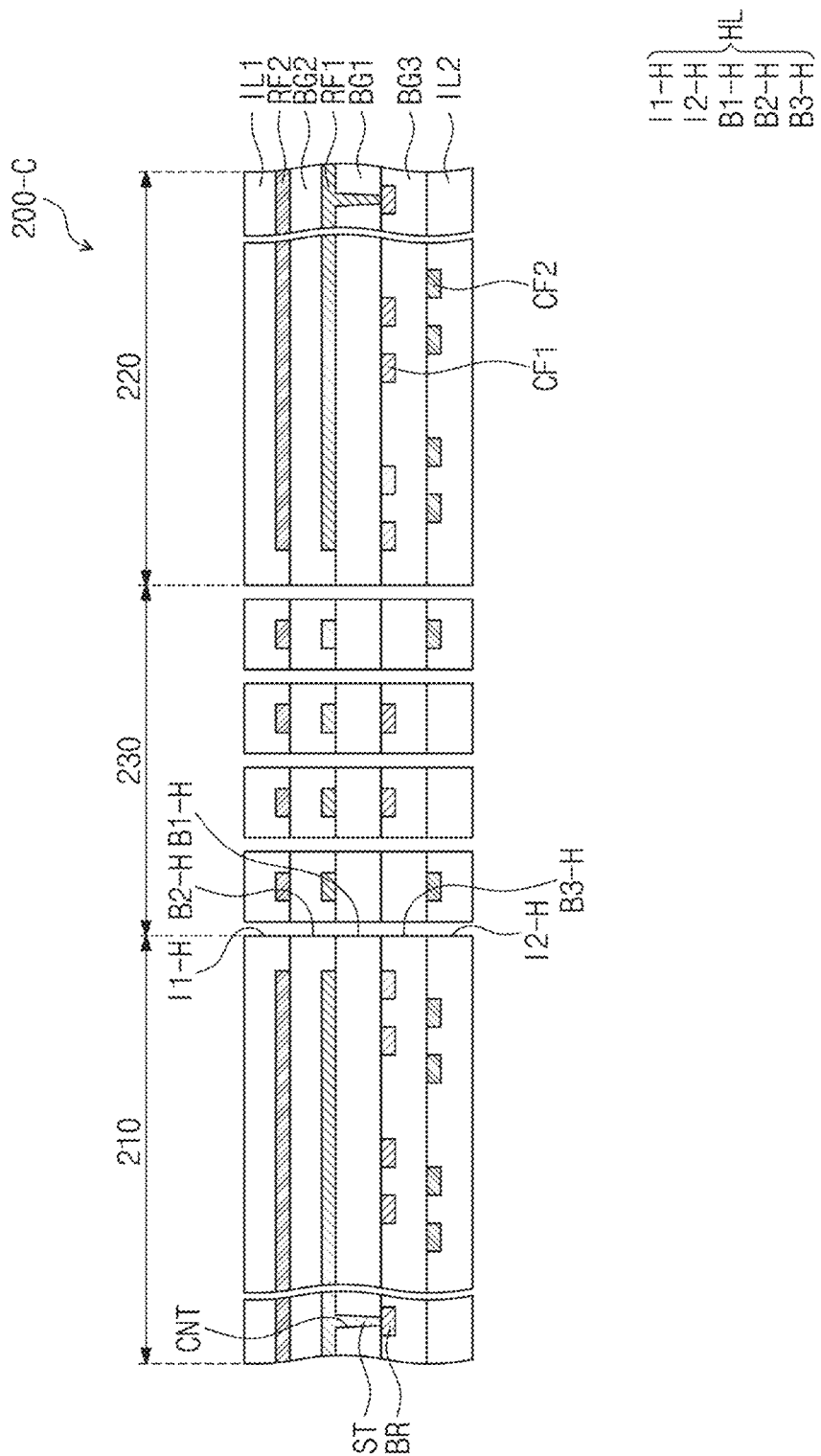
FIG. 15A is a cross-sectional view of a digitizer according to an embodiment of the invention.

FIG. 14 is an enlarged plan view of the area BB' of FIG. 4A. FIG. 15A is a cross-sectional view of a digitizer according to an embodiment of the invention. FIG. 15B is a plan view of a digitizer according to an embodiment of the invention. FIG. 15C is a plan view of a digitizer according to an embodiment of the invention. The same or like reference numerals are used in FIGS. 14 to 15C to label the same or like components as those described above with reference to FIGS. 1A to 6C, and any repetitive detailed description will be omitted or simplified.

FIGS. 14 to 15C illustrate embodiments of a second group coil included in a digitizer 200-B according to an embodiment.

Referring to FIGS. 14 and 15A, the digitizer 200-B according to an embodiment may include a first base layer BG1, a second base layer BG2, a third base layer BG3, a (1-1)-th coil RF1 of a first group coil, a (1-2)-th coil RF2 of the first group coil, a (2-1)-th coil CF1 of the second group coil, a (2-2)-th coil CF2 of the second group coil, a first insulating layer IL1 and a second insulating layer IL2.

FIG. 14 exemplarily illustrates extension lines U1 and U2 disposed in different layers among a first portion C1 (see FIG. 4B) disposed in first and second non-folding parts 210 and 220 (see FIG. 4B) and illustrates folding lines F1 and F2 disposed in different layers among a second portion C2 (see FIG. 4B) disposed in a folding part 230 (see FIG. 4B).

The (1-1)-th coil RF1 may be disposed on a front surface of the first base layer BG1. The (2-1)-th coil CF1 may be disposed on a rear surface of the first base layer BG1. First base holes B1-H may be defined in the first base layer BG1 by extending from the front surface to the rear surface thereof or penetrating through the first base layer BG1.

The second base layer BG2 may be disposed on the front surface of the first base layer BG1 to cover the (1-1)-th coil RF1. The (1-2)-th coil RF2 of the first group coil may be disposed on the second base layer BG2. Second base holes B2-H may be defined in the second base layer BG2 by extending from a front surface to a rear surface thereof or penetrating through the second base layer BG2.

The third base layer BG3 may be disposed on the rear surface of the first base layer BG1 to cover the (2-1)-th coil CF1. The (2-2)-th coil CF2 of the second group coil may be disposed under the third base layer BG3. Third base holes B3-H may be defined in the third base layer BG3 by extending from a front surface to a rear surface thereof or penetrating through the third base layer BG3.

The first insulating layer IL1 may be disposed on the front surface of the second base layer BG2 to cover the (1-2)-th coil RF2. First cover holes I1-H may be defined in the first insulating layer IL1 by extending from a front surface to a rear surface thereof or penetrating the first insulating layer IL1.

The second insulating layer IL2 may be disposed on the rear surface of the second base layer BG2 to cover the (2-2)-th coil CF2. Second cover holes I2-H may be defined in the second insulating layer IL2 by extending from a front surface to a rear surface thereof or penetrating the second insulating layer IL2.

Each of holes HL defined in the folding part 230 of the digitizer 200-B may be a hole provided by aligning inner surfaces defining a corresponding one of the first base holes B1-H, a corresponding one of the second base holes B2-H, a corresponding one of the third base holes B3-H, a corresponding one of the first cover holes I1-H, and a corresponding one of the second cover holes I2-H with each other.

In an embodiment, the holes HL may include first group holes H1 and second group holes H2. In an embodiment, for example, each of the first group holes H1 may include a (1-1)-th hole H1-1 and a (1-2)-th hole H1-2 arranged in a second direction DR2. Each of the second group holes H2 may be spaced apart from a corresponding one of the first group holes H1 in a first direction DR1 and may include a (2-1)-th hole H2-1, a (2-2)-th hole H2-2, and a (2-3)-th hole H2-3 arranged in the second direction DR2.

A portion of the (1-1)-th coil RF1 disposed near an outer edge of the first non-folding part 210 may be connected to a bridge pattern BR disposed on the rear surface of the first base layer BG1 through a connection pattern ST disposed in a contact hole CNT. This may correspond to the connection relationship between the bridge pattern BR and the (1-1)-th and (1-2)-th patterns R1-1 and R1-2 described with reference to FIG. 4A.

Referring to FIG. 15B, first lines U1 of the extension lines and first first lines (hereinafter, will be referred to as "(1-1)-th lines") F1-1 and first second lines (hereinafter, will be referred to as "(1-2)-th") lines F1-2 of the folding lines may be disposed on the rear surface of the first base layer BG1. The first lines U1, the (1-1)-th lines F1-1, and the (1-2)-th lines F1-2 may be lines included in the (2-1)-th coil CF1.

According to an embodiment, the (1-1)-th lines F1-1 and the (1-2)-th lines F1-2 of the folding lines may alternately surround different sides of the holes B1-H defined in the first base layer BG1.

In an embodiment, for example, each of the (1-1)-th lines F1-1 may surround a right side of a (1-1)-th hole H1-1 of a corresponding one of first group holes H1 to extend in the second direction DR2 and surround a left side of a (1-2)-th hole H1-2 of the corresponding one of the first group holes H1 to extend. The (1-1)-th line F1-1 may be repeatedly disposed having the same shape as described above and may extend in the second direction DR2.

Each of the (1-2)-th lines F1-2 may surround a left side of a (2-1)-th hole H2-1 of a corresponding one of second group holes H2 to extend in the second direction DR2, surround a right side of a (2-2)-th hole H2-2 of the corresponding one of the second group holes H2 to extend in the second direction DR2, and surround a left side of a (2-3)-th hole H2-3 of the corresponding one of the second group holes H2 to extend. The (1-2)-th line F1-2 may be repeatedly disposed with the same shape as described above and may extend in the second direction DR2.

Referring to FIG. 15C, second lines U2 of the extension lines and first second lines (hereinafter, will be referred to as "(2-1)-th lines") F2-1 and second second lines (hereinafter, will be referred to as "(2-2)-th lines") F2-2 of the folding lines may be disposed on the rear surface of the third base layer BG3. The second lines U2, the (2-1)-th lines F2-1, and the (2-2)-th lines F2-2 may be lines included in the (2-2)-th coil CF2.

According to an embodiment, the (2-1)-th lines F2-1 and the (2-2)-th lines F2-2 of the folding lines may alternately surround different sides of the holes B3-H defined in the third base layer BG3.

In an embodiment, for example, each of the (2-1)-th lines F2-1 may surround a left side of a (1-1)-th hole H1-1 of a corresponding one of first group holes H1 to extend in the second direction DR2 and surround a right side of a (1-2)-th hole H1-2 of the corresponding one of the first group holes H1 to extend. The (2-1)-th line F2-1 may be repeatedly disposed with the same shape as described above and may extend in the second direction DR2.

Each of the (2-2)-th lines F2-2 may surround a right side of a (2-1)-th hole H2-1 of a corresponding one of second group holes H2 to extend in the second direction DR2, surround a left side of a (2-2)-th hole H2-2 of the corresponding one of the second group holes H2 to extend in the second direction DR2, and surround a right side of a (2-3)-th hole H2-3 of the corresponding one of the second group holes H2 to extend. The (2-2)-th line F2-2 may be repeatedly disposed with the same shape as described above and may extend in the second direction DR2.

According to an embodiment of the invention, by reducing the number of lines passing between adjacent holes among the holes defined in the folding part of the digitizer, the line widths (or the surface areas of the cross sections) of the lines passing between the holes may be increased, and thus the resistance of the sensing coils may be reduced. In such an embodiment, by disposing the sensing coils also in the folding part, it is possible to provide an electronic apparatus having improved sensing sensitivity in the folding part.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic apparatus comprising:
    a display panel including first and second non-folding areas arranged in a first direction and a folding area disposed between the first and second non-folding areas, wherein the folding area is foldable about a folding axis extending in a second direction crossing the first direction; and
    a digitizer disposed under the display panel,
    wherein the digitizer comprises:
        base layers, each including a folding part which overlaps the folding area and in which holes are defined, a first non-folding part overlapping the first non-folding area, and a second non-folding part overlapping the second non-folding area;
        a first group coil including first to fourth sensing coils, each including a first portion overlapping the first non-folding part and extending in the first direction, a second portion overlapping the second non-folding part and extending in the first direction, and a third portion overlapping the folding part and surrounding a portion of each of corresponding holes of the holes; and
        a second group coil insulated from the first group coil,
    wherein two or fewer third portions are disposed in a same layer between holes adjacent to each other in the second direction among the holes.

2. The electronic apparatus of claim 1, wherein the base layers comprise a first base layer including a front surface and a rear surface and a second base layer disposed on the front surface of the first base layer,
    wherein the second group coil is disposed on the rear surface of the first base layer.

3. The electronic apparatus of claim 2, wherein
    the first to fourth sensing coils are sequentially arranged in the second direction,
    the first and second sensing coils are disposed on the front surface of the first base layer, and
    the third and fourth sensing coils are disposed on a front surface of the second base layer.

4. The electronic apparatus of claim 3, wherein, when viewed in a plan view, a separation distance in the second direction between the first portion of the first sensing coil and the first portion of the second sensing coil is shorter than a separation distance in the second direction between the first portion of the second sensing coil and the first portion of the third sensing coil.

5. The electronic apparatus of claim 3, wherein the first group coil further comprises a bridge pattern disposed on the rear surface of the first base layer,
    wherein the first portion of at least one selected from the first to fourth sensing coils is connected to the bridge pattern through a contact hole defined in at least one selected from the base layers.

6. The electronic apparatus of claim 2, wherein
    the first to fourth sensing coils are sequentially arranged in the second direction,
    the first and third sensing coils are disposed on the front surface of the first base layer, and
    the second and fourth sensing coils are disposed on a front surface of the second base layer.

7. The electronic apparatus of claim 6, wherein, when viewed in a plan view, a separation distance in the second direction between the first portion of the first sensing coil and the first portion of the third sensing coil is equal to a separation distance in the second direction between the first portion of the second sensing coil and the first portion of the fourth sensing coil.

8. The electronic apparatus of claim 1, wherein the base layers comprise a first base layer including a front surface and a rear surface, a second base layer disposed on the front surface of the first base layer, a third base layer disposed on the second base layer, and a fourth base layer disposed on the third base layer,
    wherein the second group coil is disposed on the rear surface of the first base layer.

9. The electronic apparatus of claim 8, wherein
    the first sensing coil is disposed on the front surface of the first base layer,
    the second sensing coil is disposed on a front surface of the second base layer,
    the third sensing coil is disposed on a front surface of the third base layer, and
    the fourth sensing coil is disposed on a front surface of the fourth base layer.

10. The electronic apparatus of claim 1, wherein the holes defined in each of the base layers comprise a first group hole and a second group hole each including some of the holes which each extend in the second direction and are arranged to be spaced apart from each other in the second direction, wherein the second group hole is shifted from the first group hole by a predetermined distance in the second direction.

11. The electronic apparatus of claim 10, wherein
a first group hole defined in one base layer of the base layers overlaps a first group hole defined in another base layer of the base layers, and
a second group hole defined in the one base layer overlaps a second group hole defined in the another base layer.

12. The electronic apparatus of claim 11, wherein, when viewed in a plan view, four third portions are disposed between holes adjacent to each other in the second direction among the holes.

13. The electronic apparatus of claim 10, wherein
a first group hole defined in one base layer of the base layers is shifted by a predetermined distance in the second direction from a first group hole defined in another base layer of the base layers, and
a second group hole defined in the one base layer is shifted by a predetermined distance in the second direction from a second group hole defined in the another base layer.

14. The electronic apparatus of claim 13, wherein, when viewed in a plan view, two third portions are disposed in a same layer between holes adjacent to each other in the second direction among the holes.

15. The electronic apparatus of claim 1, wherein
one of sensing coils included in the second group coil comprises a fourth portion overlapping the first non-folding part and extending in the second direction, a fifth portion overlapping the second non-folding part and extending in the second direction, and a sixth portion overlapping the folding part and surrounding a portion of each of holes arranged to be spaced apart from each other in the second direction among the holes, and
the holes comprise a first hole and a second hole which are arranged to be spaced apart from each other in the second direction and each include one side and an opposing side opposite to the one side about a central axis extending parallel to the second direction,
wherein the sixth portion faces the one side of the first hole and faces the opposing side of the second hole.

16. The electronic apparatus of claim 15, wherein the base layers comprise a first base layer including a front surface and a rear surface and a second base layer disposed on the rear surface of the first base layer,
wherein a sixth portion of one of the sensing coils included in the second group coil is disposed on the rear surface of the first base layer, and
a sixth portion of another of the sensing coils included in the second group coil is disposed on a rear surface of the second base layer.

17. The electronic apparatus of claim 1, wherein each of the base layers comprises a matrix including a filler, and fiber lines which are disposed inside the matrix and have a woven shape.

18. The electronic apparatus of claim 1, wherein
the matrix comprises at least one selected from epoxy, polyester, polyamides, polycarbonates, polypropylene, polybutylene, and vinyl ester, and
the filler comprises at least one selected from silica, barium sulphate, sintered talc, barium titanate, titanium oxide, clay, alumina, mica, boehmite, zinc borate, and zinc titanate.

19. The electronic apparatus of claim 1, wherein
a first width of each of the holes in the first direction is in a range of about 0.1 mm to about 0.5 mm, and
a second width of each of the holes in the second direction is in a range of about 4 mm to about 10 mm.

20. The electronic apparatus of claim 1, wherein
a first separation distance between holes adjacent to each other in the first direction among the holes is in a range of about 0.1 mm to about 0.3 mm, and
a second separation distance between holes adjacent to each other in the second direction among the holes is in a range of about 0.1 mm to about 0.3 mm.

* * * * *